(12) United States Patent
Lee et al.

(10) Patent No.: US 11,715,273 B2
(45) Date of Patent: Aug. 1, 2023

(54) METHOD FOR DISPLAYING AR NAVIGATION SCREEN, AND AR NAVIGATION SYSTEM

(71) Applicant: LG ELECTRONICS INC., Seoul (KR)

(72) Inventors: Kihyung Lee, Seoul (KR); Junyoung Jung, Seoul (KR); Aettie Ji, Seoul (KR); Kyungjin Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/756,894

(22) PCT Filed: Dec. 3, 2019

(86) PCT No.: PCT/KR2019/016966
§ 371 (c)(1),
(2) Date: Jun. 3, 2022

(87) PCT Pub. No.: WO2021/112274
PCT Pub. Date: Jun. 10, 2021

(65) Prior Publication Data
US 2023/0013521 A1    Jan. 19, 2023

(51) Int. Cl.
*G06T 19/00* (2011.01)
*G06T 7/70* (2017.01)
(Continued)

(52) U.S. Cl.
CPC .............. *G06T 19/006* (2013.01); *G06T 7/70* (2017.01); *G06T 19/20* (2013.01);
(Continued)

(58) Field of Classification Search
CPC .............................. G06T 11/00; G06T 19/006
See application file for complete search history.

(56) References Cited

U.S. PATENT DOCUMENTS

2006/0281400 A1* 12/2006 Ueyama ................ H04H 60/27
455/3.01
2012/0059720 A1* 3/2012 Musabji ............. G01C 21/3647
701/527
(Continued)

FOREIGN PATENT DOCUMENTS

KR    1020130137064    12/2013
KR    1020150053951    5/2015
(Continued)

OTHER PUBLICATIONS

English Translation of KR 20150064767, 2015 (Year: 2015).*
(Continued)

*Primary Examiner* — Charles Tseng
(74) *Attorney, Agent, or Firm* — Lee Hong Degerman Kang & Waimey

(57) ABSTRACT

The present specification discloses a method for displaying an AR navigation screen, and an AR navigation system. The method for displaying an AR navigation screen according to the present specification may comprise the steps of: overlapping and displaying images of the surroundings of a vehicle and a plurality of AR images corresponding to the images of the surroundings; generating a window for separately displaying a first area including AR images overlapping at least one of the plurality of AR images; and overlapping and displaying the window and the images of the surroundings. The invention of the present specification has the effect of improving user convenience and promoting safe vehicle operation by using a window when AR images and the like are difficult to recognize due to being overlapped.

15 Claims, 19 Drawing Sheets

(51) Int. Cl.
*G06T 19/20* (2011.01)
*H04W 4/40* (2018.01)
*G01C 21/36* (2006.01)

(52) U.S. Cl.
CPC .................. *G01C 21/3632* (2013.01); *G06T 2207/30252* (2013.01); *G06T 2219/2016* (2013.01); *H04W 4/40* (2018.02)

(56) References Cited

U.S. PATENT DOCUMENTS

| | | | | |
|---|---|---|---|---|
| 2012/0105476 | A1* | 5/2012 | Tseng | G01C 21/3632 345/633 |
| 2014/0285523 | A1* | 9/2014 | Gruenler | G06T 19/006 345/633 |
| 2016/0153801 | A1* | 6/2016 | Cho | G06T 11/60 701/431 |
| 2017/0187963 | A1 | 6/2017 | Lee et al. | |
| 2017/0253181 | A1* | 9/2017 | Choi | B60R 1/00 |
| 2018/0066956 | A1* | 3/2018 | Kim | G06T 19/006 |
| 2020/0090375 | A1* | 3/2020 | Mori | G02B 27/01 |

FOREIGN PATENT DOCUMENTS

| | | | | |
|---|---|---|---|---|
| KR | 20150064767 | A * | 12/2015 | ........... H04N 5/2625 |
| KR | 1020170047886 | | 5/2017 | |
| KR | 101957943 | | 7/2019 | |
| KR | 1020190120122 | | 10/2019 | |

OTHER PUBLICATIONS

PCT International Application No. PCT/KR2019/016966, International Search Report dated Aug. 28, 2020, 2 pages.
Korean Intellectual Property Office Application Serial No. 10-2022-7017719, Notice of Allowance dated Oct. 14, 2022, 2 pages.

* cited by examiner

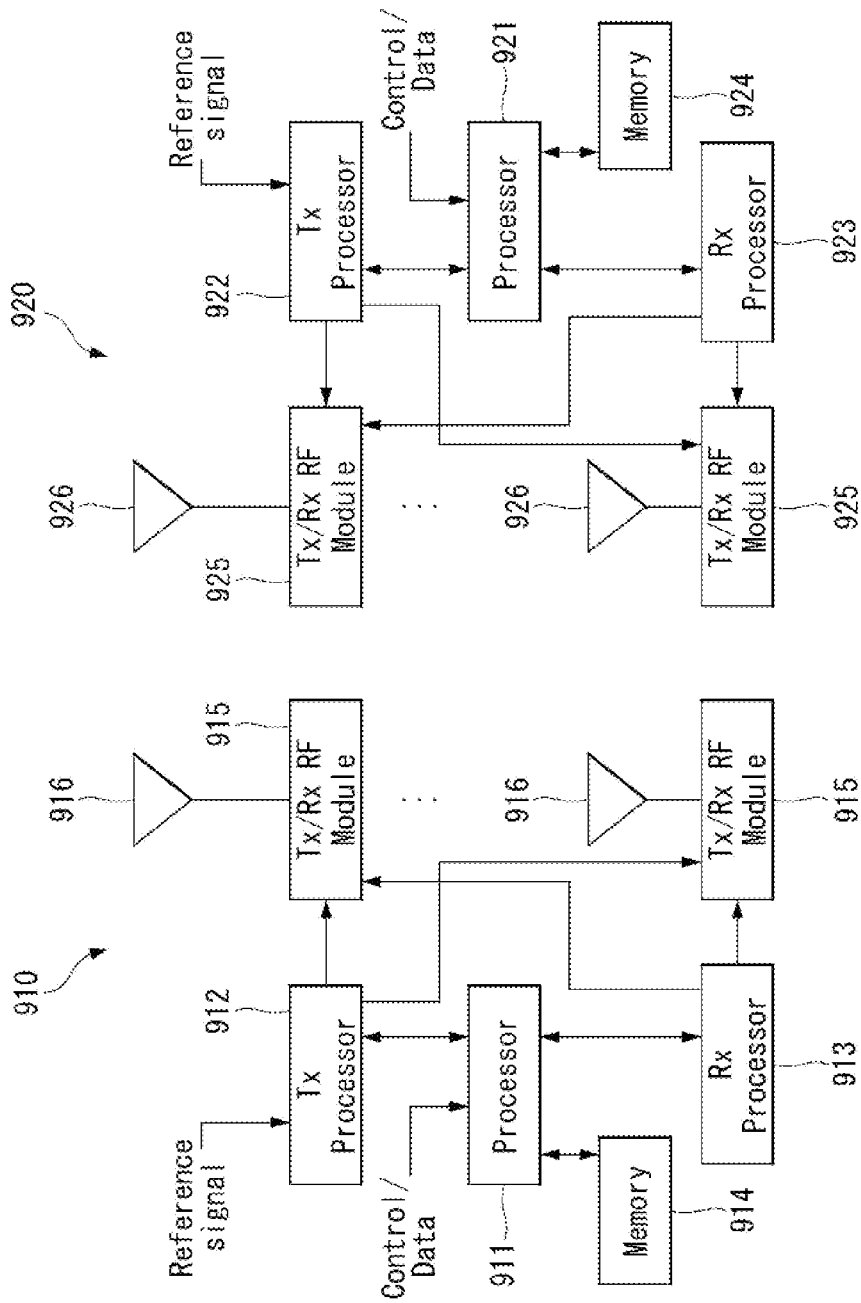
[FIG. 1]

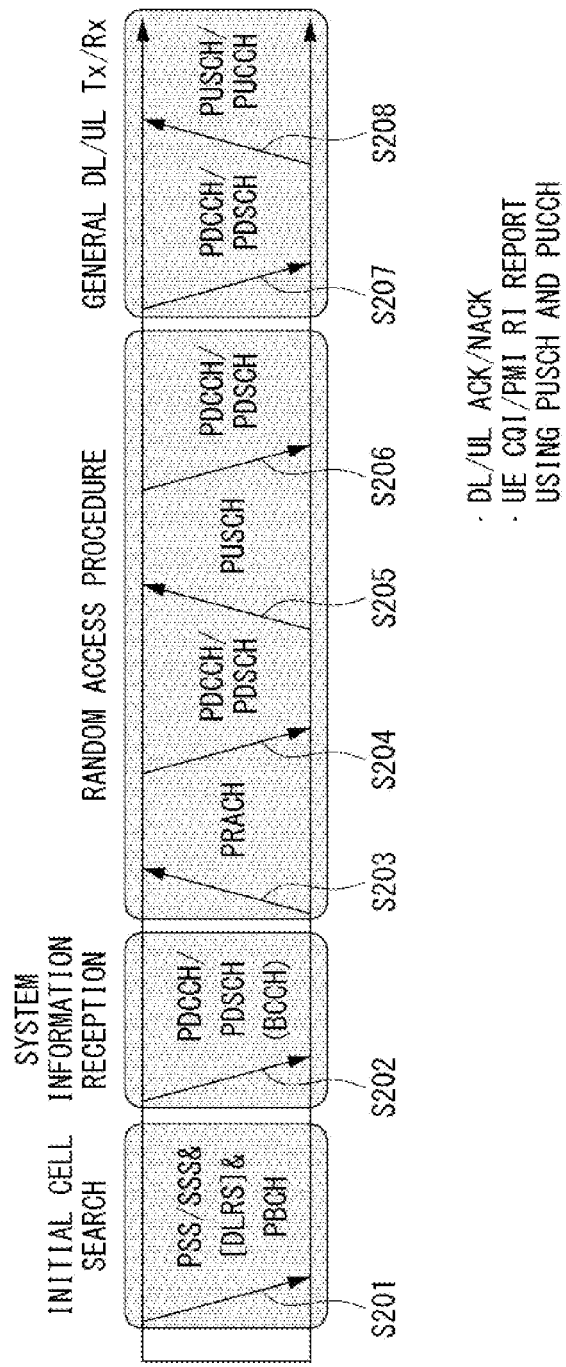
[FIG. 2]

[FIG. 3]
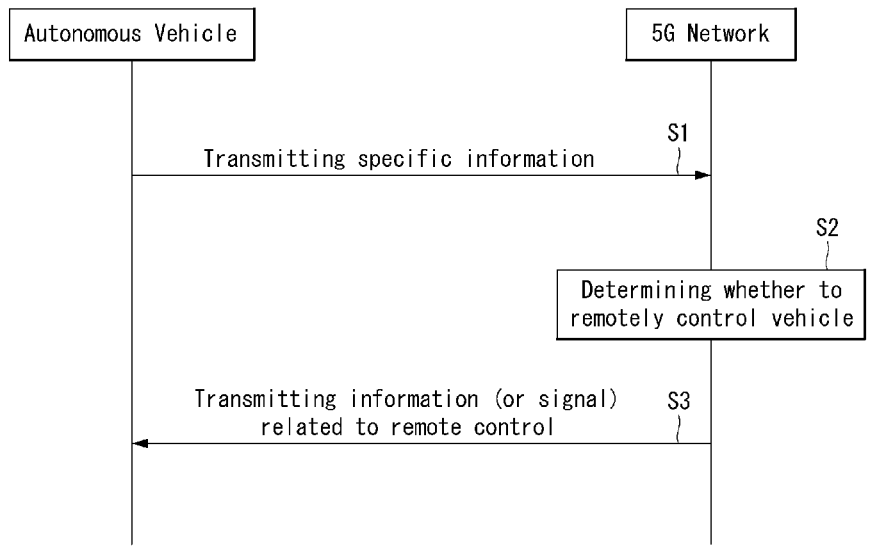
[FIG. 4]
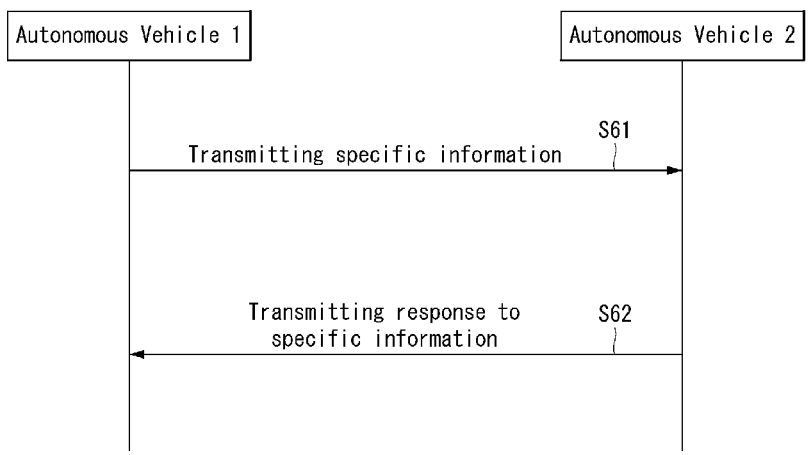
[FIG. 5]
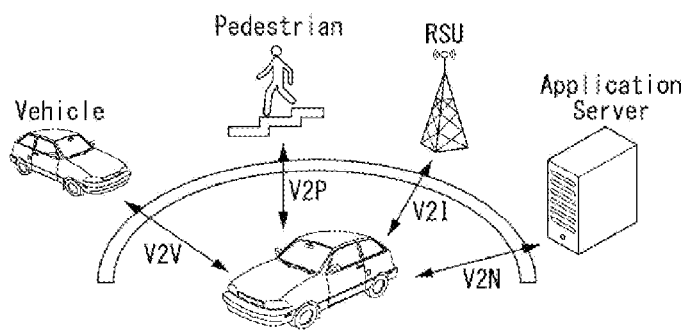

[FIG. 6]
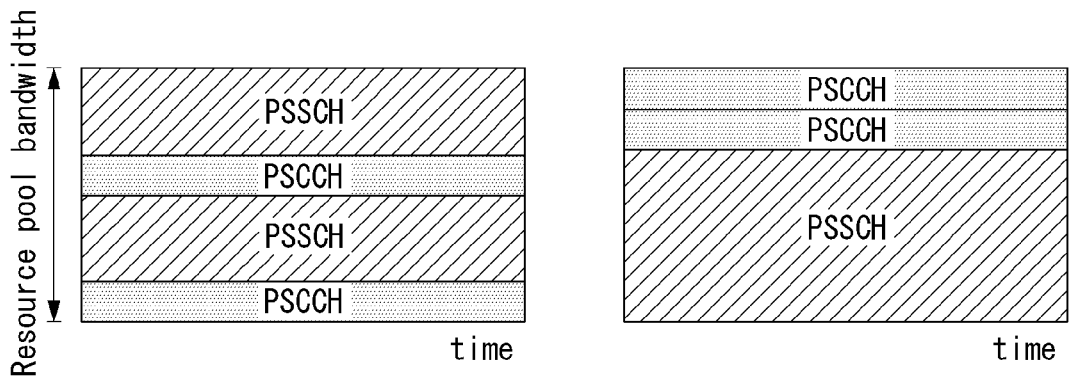
[FIG. 7]
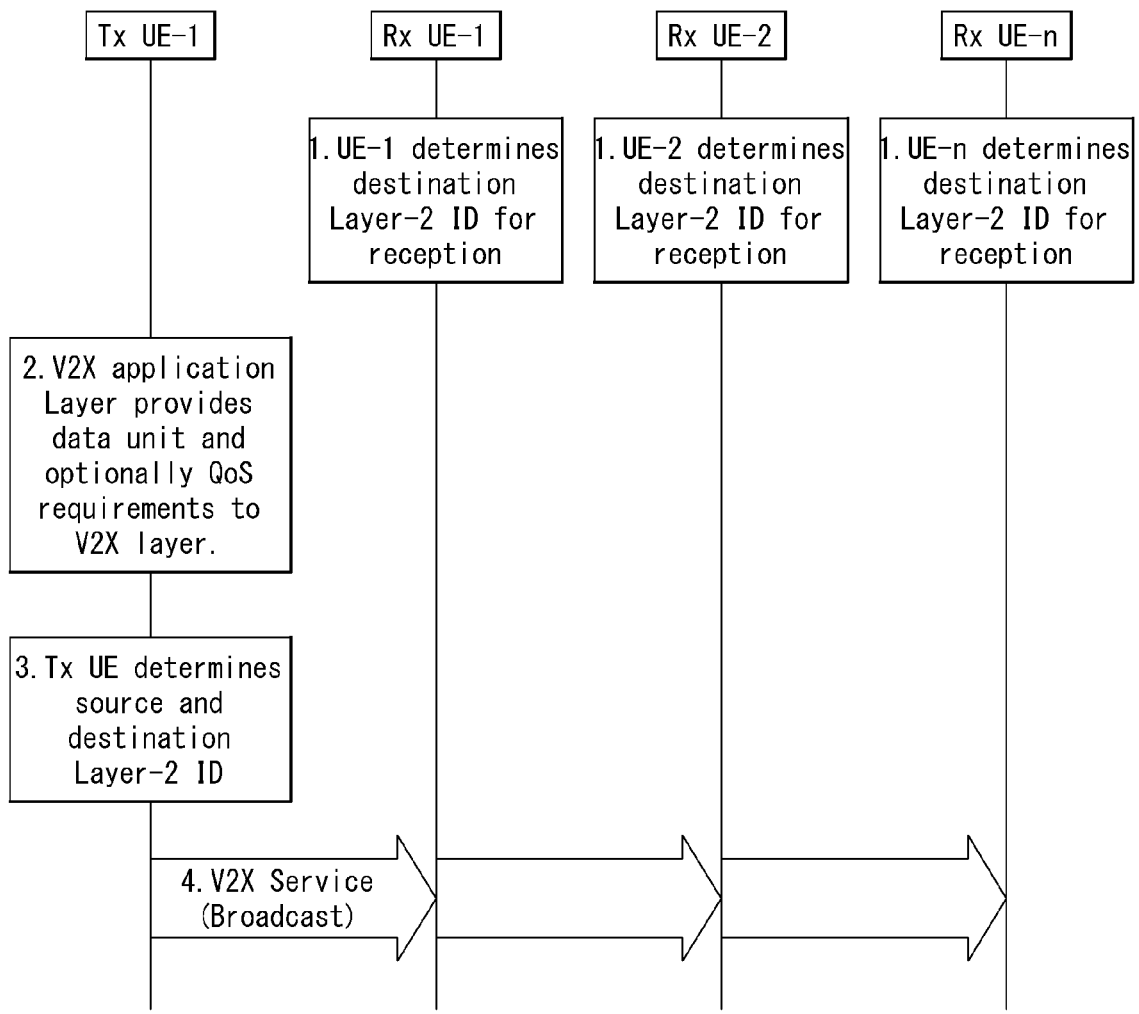

[FIG. 8]
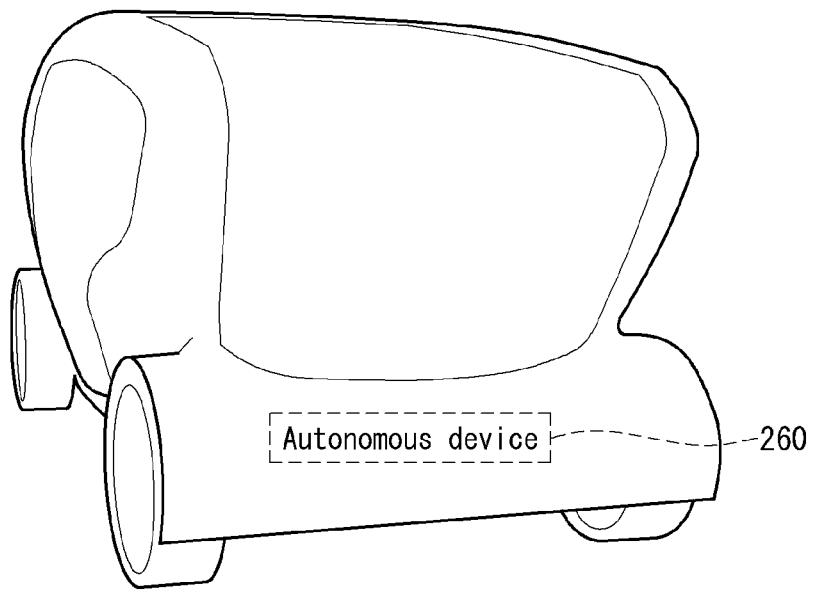
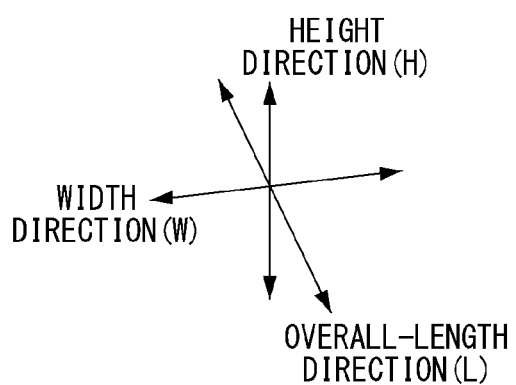

[FIG. 9]
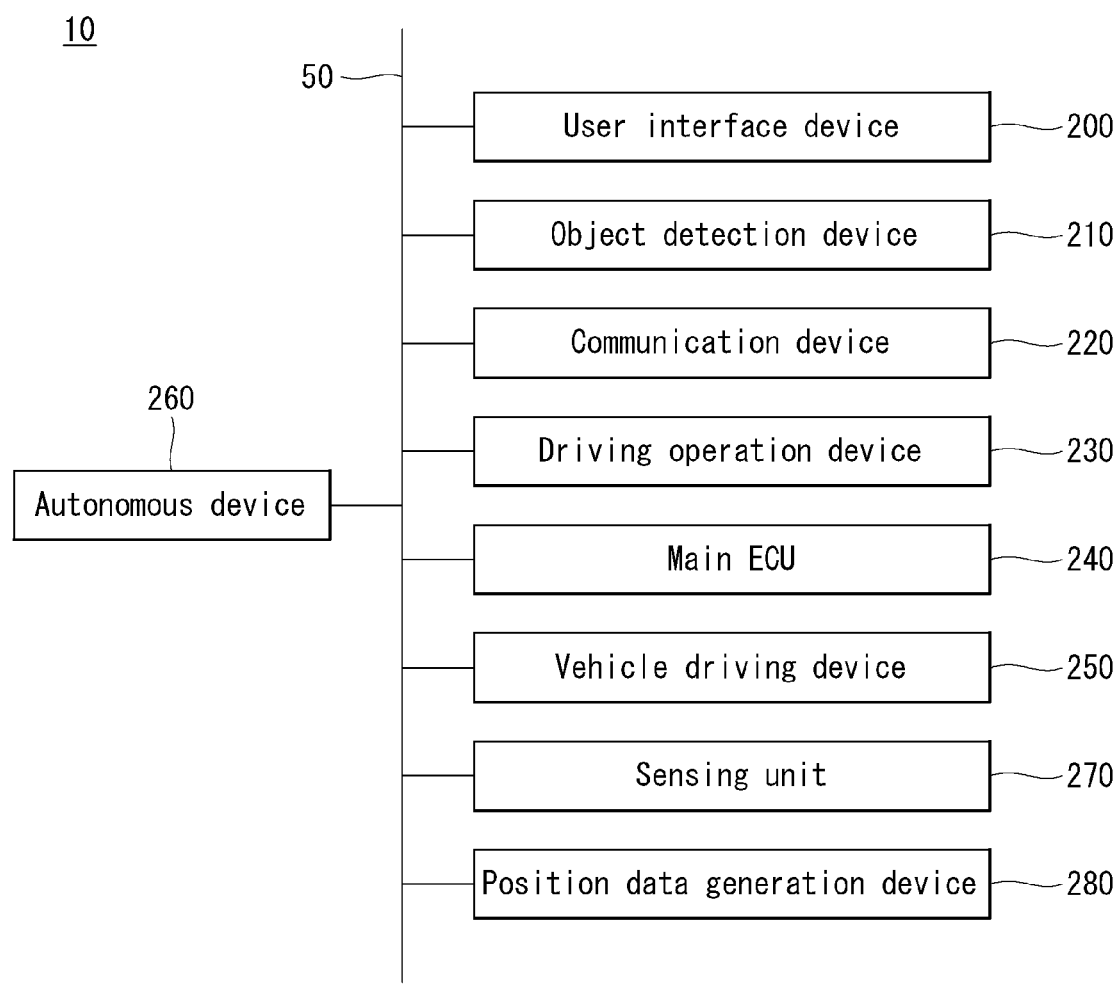

[FIG. 10]
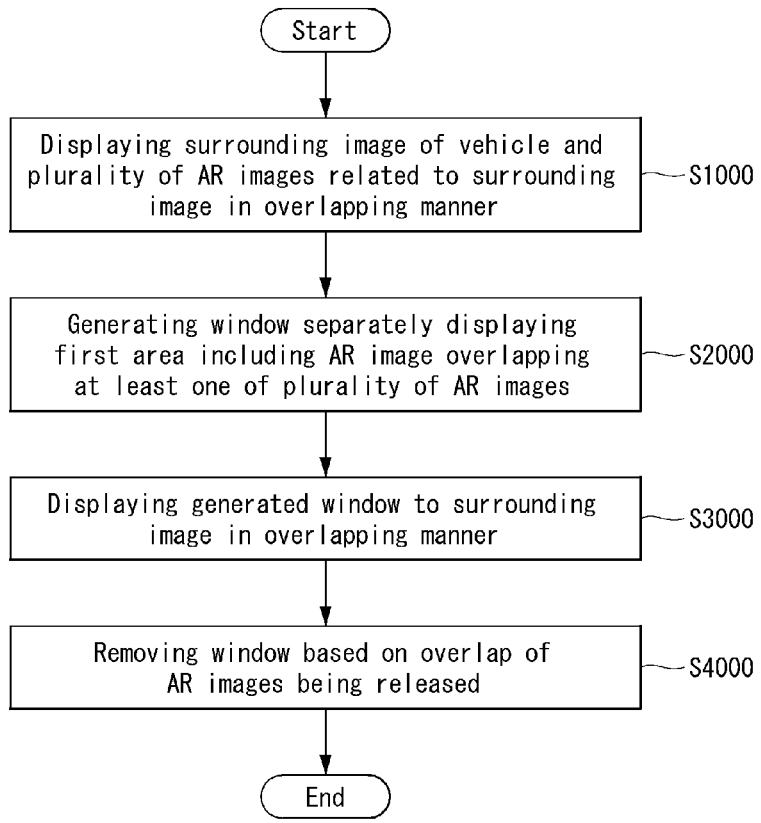
[FIG. 11]
S1000
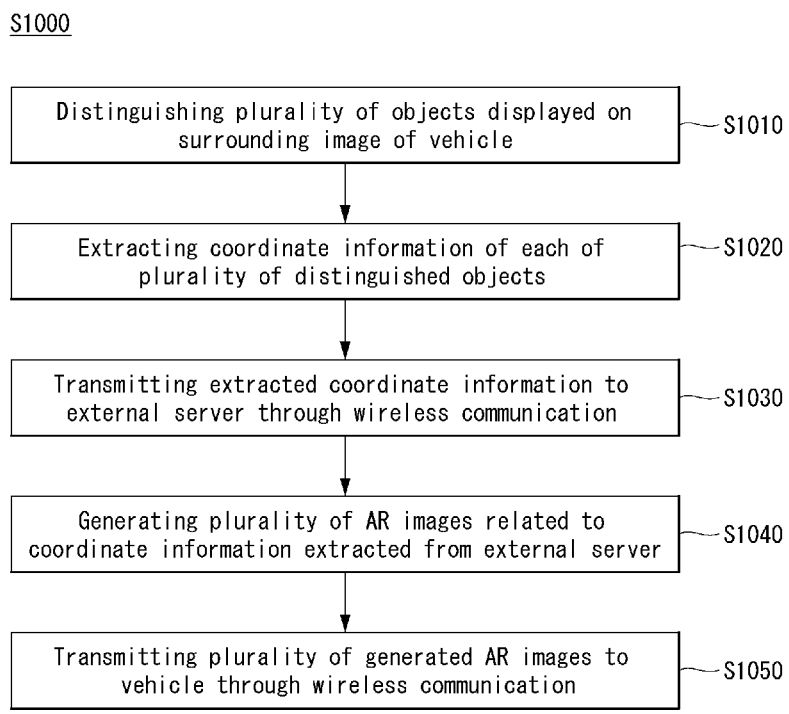

【FIG. 12A】
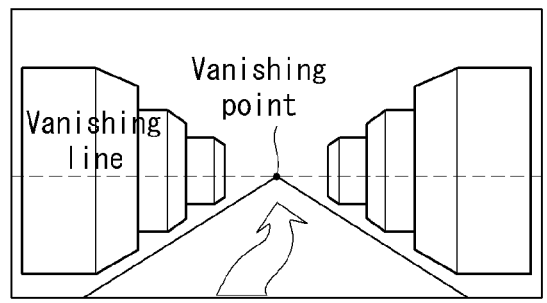
【FIG. 12B】
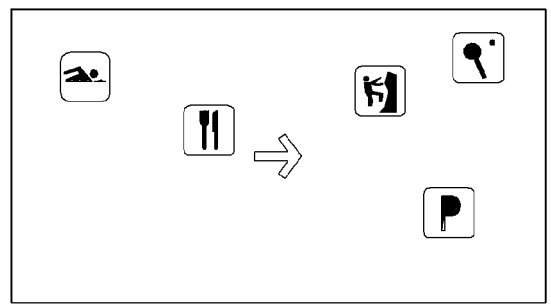
【FIG. 12C】
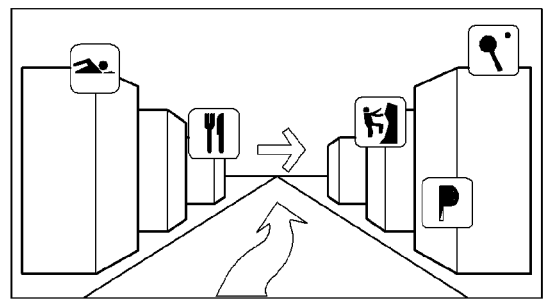

[FIG. 13A]
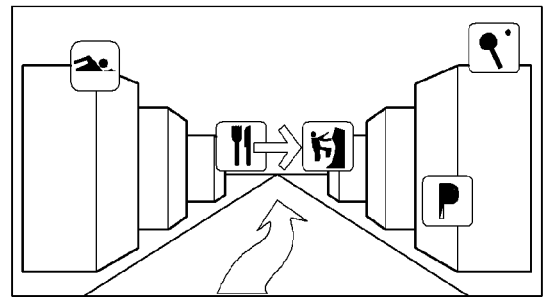
[FIG. 13B]
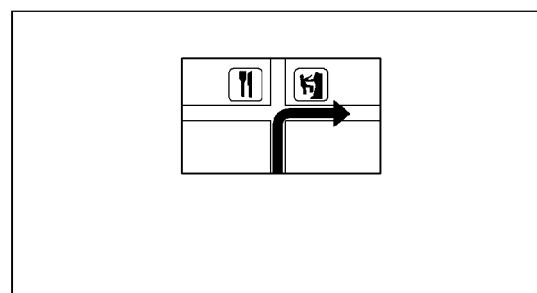
[FIG. 13C]
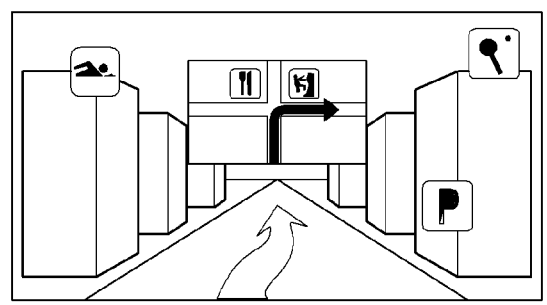

[FIG. 14]
S2000
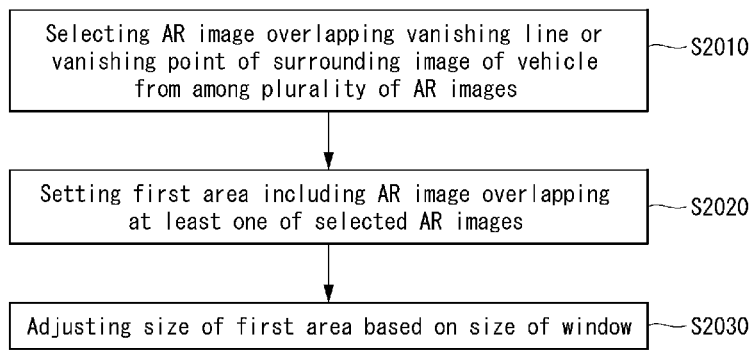
[FIG. 15]
S2030
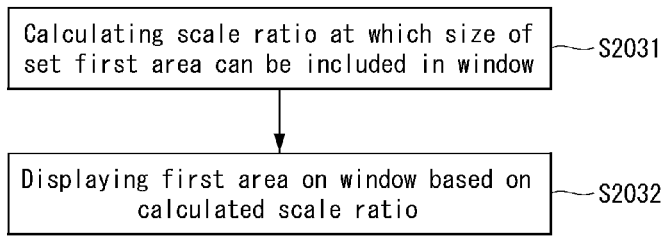

【FIG. 16A】
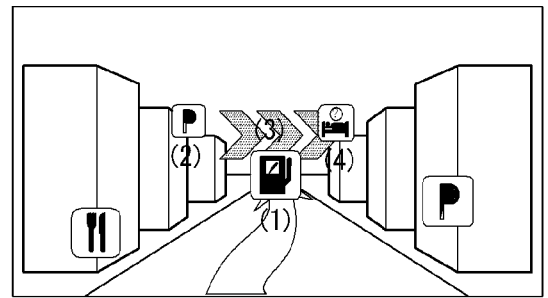
【FIG. 16B】
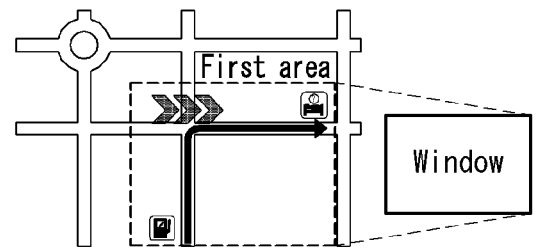
【FIG. 16C】
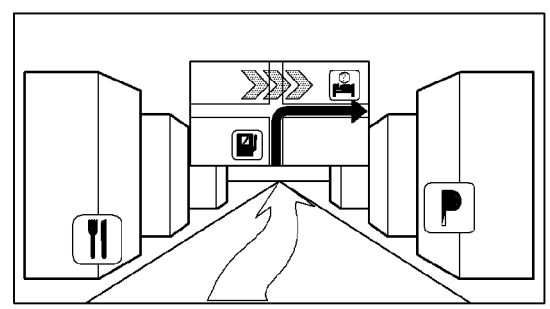

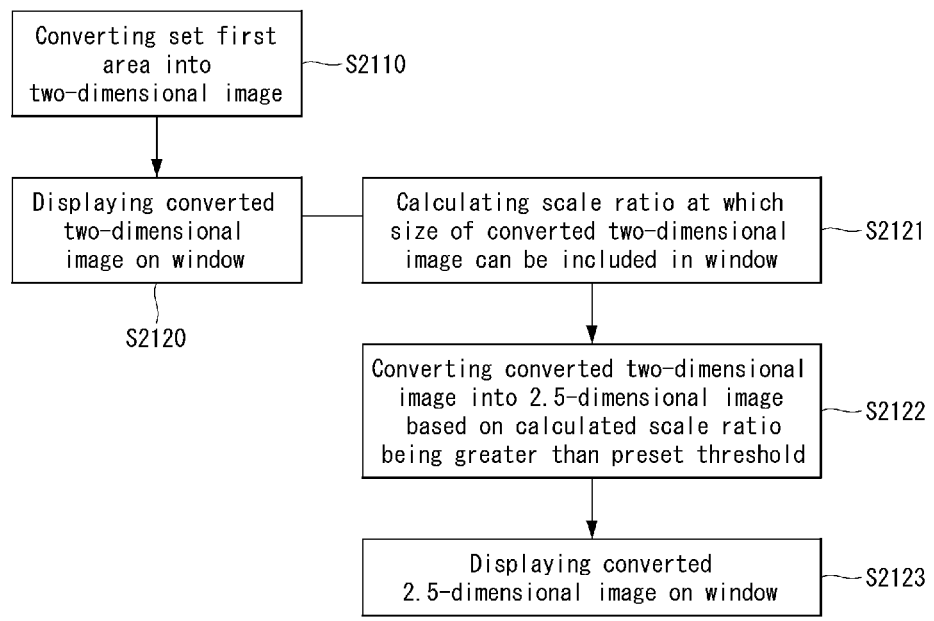

【FIG. 18A】
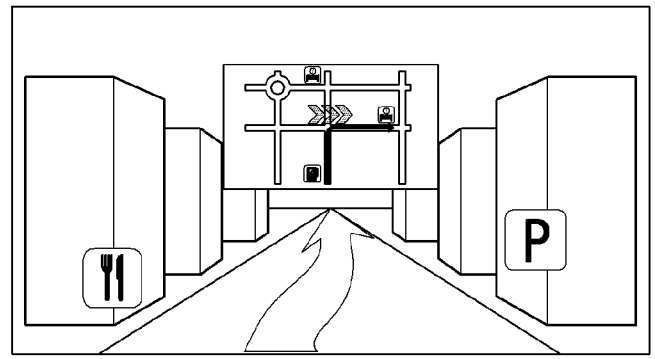
【FIG. 18B】
Rotating 2D image
by 15 degrees and
displaying 2.5D
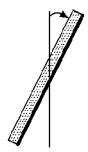
【FIG. 18C】
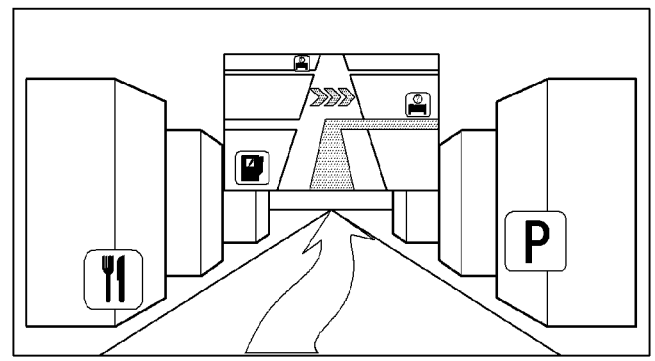
【FIG. 19】
S2000
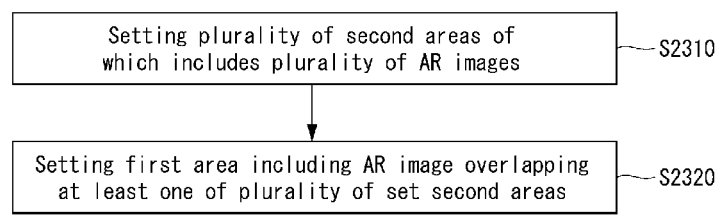

【FIG. 20A】
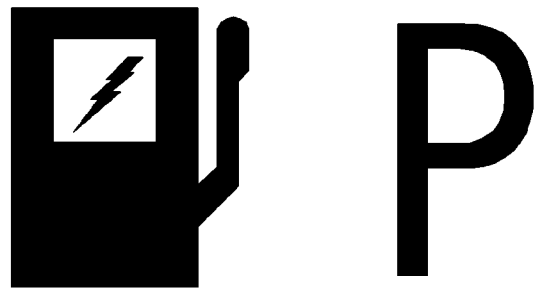
【FIG. 20B】
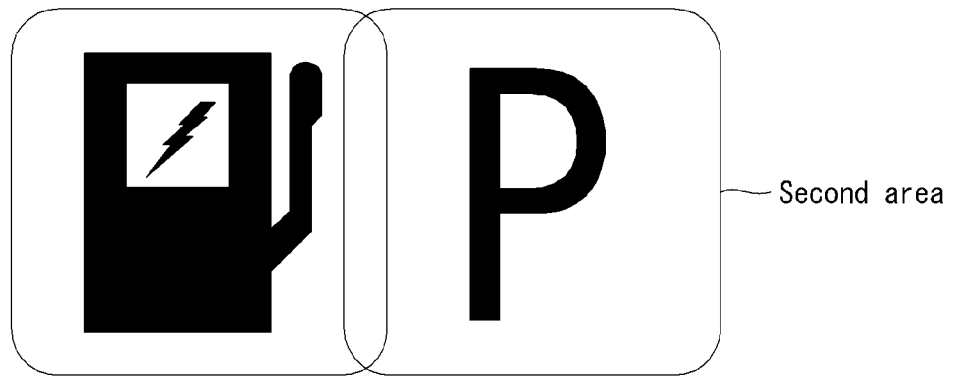

【FIG. 21A】
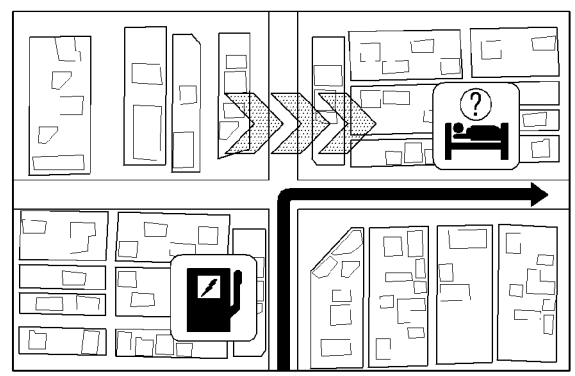
【FIG. 21B】
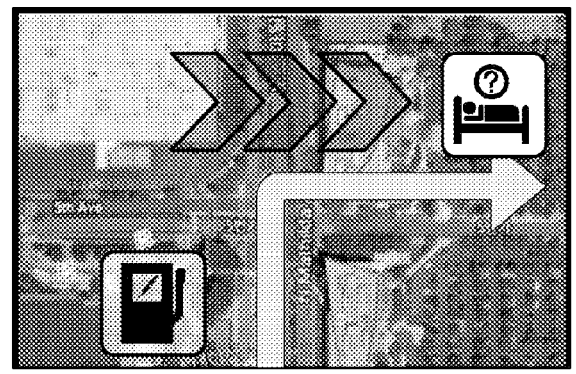

【FIG. 22A】
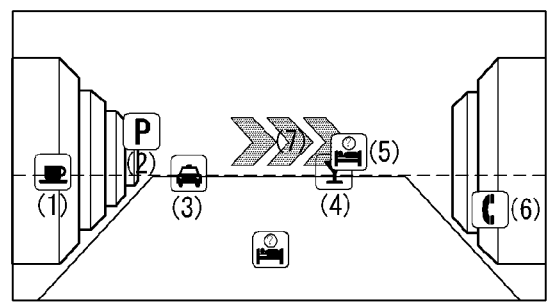
【FIG. 22B】
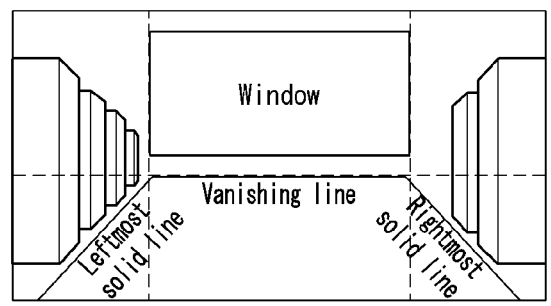
【FIG. 22C】
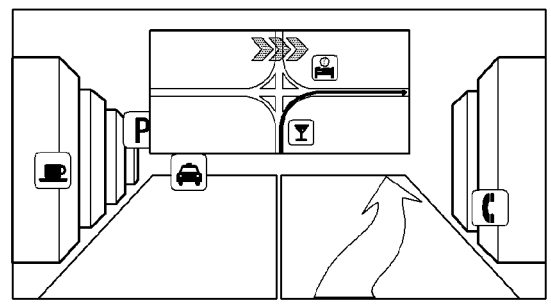

[FIG. 23]

| Type of road | Next guidance time | | Whether object exists near vanishing point/vanishing line | |
|---|---|---|---|---|
| | | | Existence | Non-existence |
| General road (Other road, Local road) | Before guidance | – | Non-display | Non-display |
| | Initial guidance | 200m ~ 100m | Display | Non-display |
| | Immediately preceding guidance | 100m ~ 50m | Display | Non-display |
| | End of the guidance | – | Non-display | Non-display |
| Main road (Automobile-only road) | Before guidance | – | Non-display | Non-display |
| | Initial guidance | 500m ~ 200m | Display | Non-display |
| | Immediately preceding guidance | 200m ~ 100m | Display | Non-display |
| | End of the guidance | – | Non-display | Non-display |
| Highway | Before guidance | – | Non-display | Non-display |
| | Initial guidance | 1000m ~ 500m | Display | Non-display |
| | Immediately preceding guidance | 500m ~ 100m | Display | Non-display |
| | End of the guidance | – | Non-display | Non-display |

[FIG. 24]

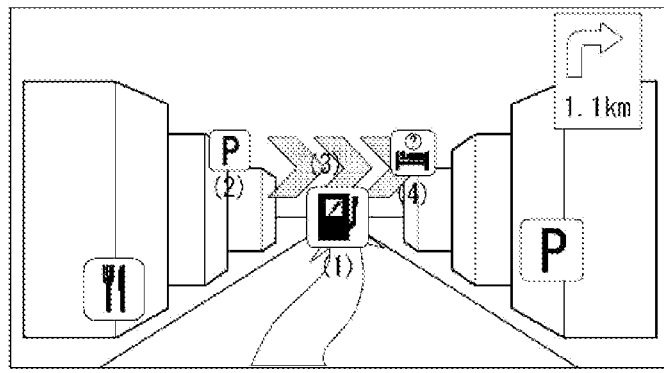

[FIG. 25]

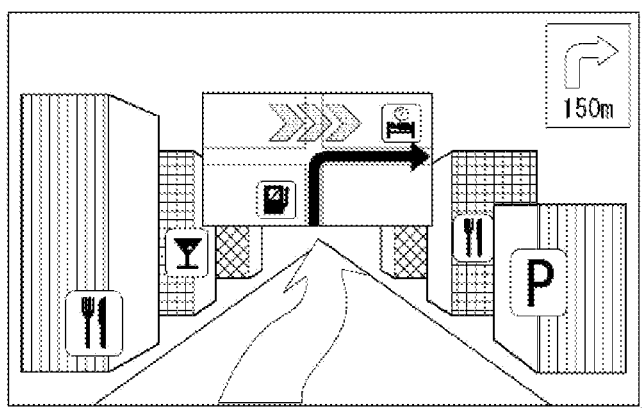

[FIG. 26]
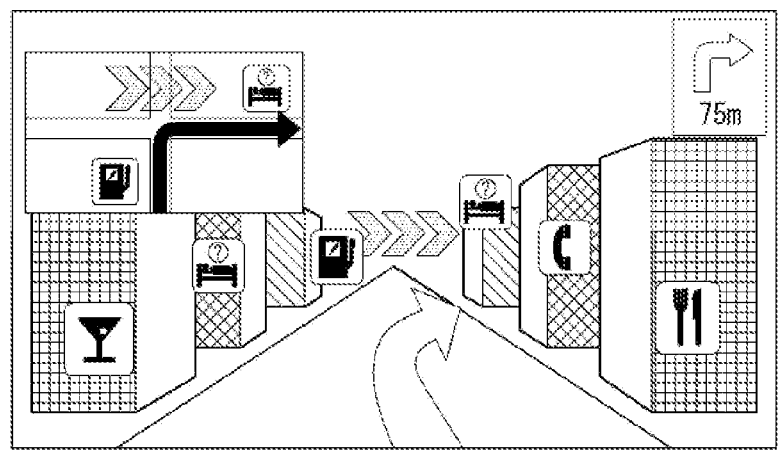
[FIG. 27]
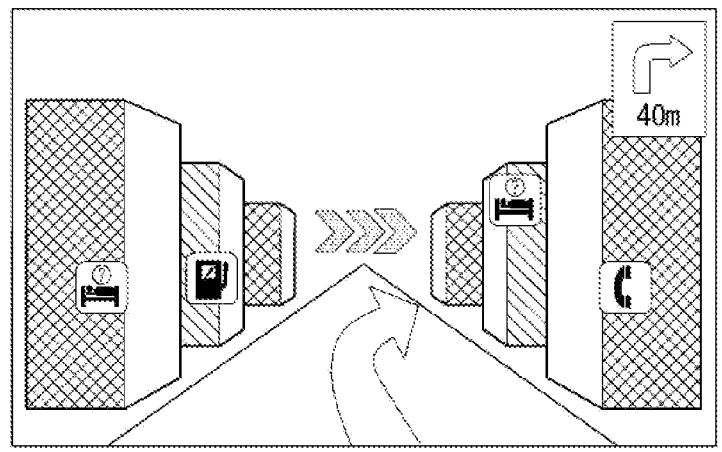

[FIG. 28]
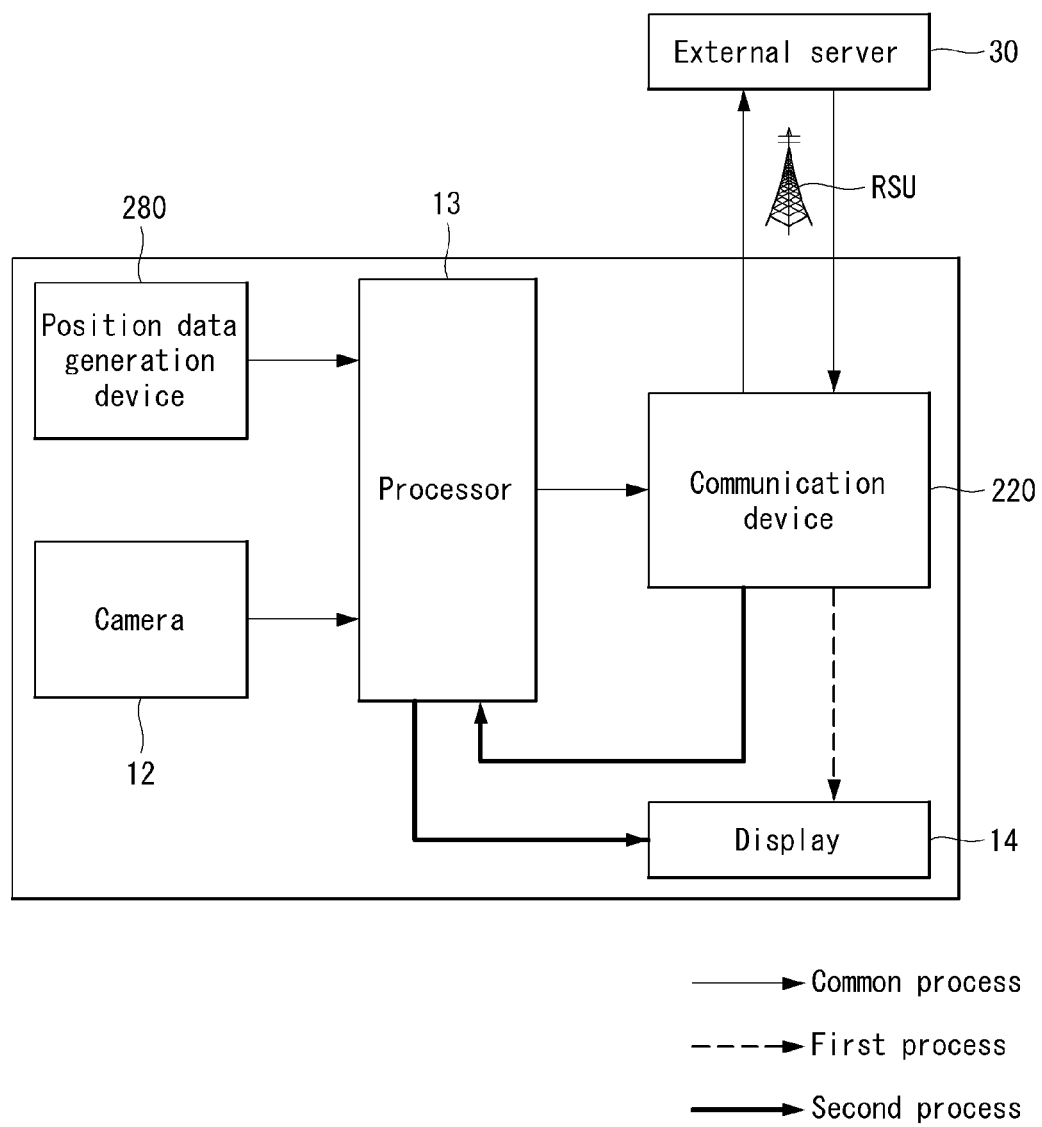

METHOD FOR DISPLAYING AR NAVIGATION SCREEN, AND AR NAVIGATION SYSTEM

CROSS-REFERENCE TO RELATED APPLICATIONS

This application is the National Stage filing under 35 U.S.C. 371 of International Application No. PCT/KR2019/016966, filed on Dec. 3, 2019, the contents of which are all incorporated by reference herein in its entirety.

TECHNICAL FIELD

The present disclosure relates to a method of displaying AR navigation screen and AR navigation.

BACKGROUND ART

In general, a navigation terminal is a device that provides a user's position and route guidance from an arrival point to a destination, and includes vehicle, ship, air, and portable navigation devices.

Among them, the vehicle navigation terminal is built in the vehicle or installed so that it can be mounted/detached, and provides a position of a moving object, road information, route information, and various additional information related to the position (information related to dangerous areas, accident black spots, enforcement sections and surrounding facilities, etc.), so that the user can arrive at the destination more quickly and safely.

As a result of recent steady technology development, the vehicle navigation terminal can express a lot of information using Augmented Reality (hereinafter, referred to as AR) technology. In this way, based on a lot of information being displayed on the navigation screen based on AR images, etc., there is a problem that the user cannot recognize the AR images well, such as overlapping the AR images.

DISCLOSURE

Technical Problem

In order to solve the above problems, in case AR images, etc. overlap and recognition is difficult, an object of the present disclosure is to provide a method of displaying AR navigation screen and AR navigation system that can enhance user convenience by utilizing a window in case AR images, etc. overlap and recognition is difficult.

In addition, another object of the present disclosure is to propose a condition for determining whether the recognition is difficult due to overlapping AR images, etc. so as to provide a method of displaying AR navigation screen and AR navigation system that can more quickly determine whether it is difficult for a user to recognize an AR image or the like.

In addition, yet another object of the present disclosure is to propose a window including an optimized size, position, and content, so as to provide a method of displaying AR navigation screen and AR navigation system in which a user can more easily recognize an AR image to promote safe driving.

Technical Solution

In order to solve the above problems, the present disclosure may include displaying a surrounding image of a vehicle and a plurality of AR images related to the surrounding image in an overlapping manner, generating a window separately displaying a first area including an AR image overlapping at least one of the plurality of AR images, and displaying the window to the surrounding image in the overlapping manner.

The plurality of AR images may be respectively related to a plurality of objects displayed on the surrounding image and respectively displayed at positions corresponding to coordinates of the plurality of objects.

The displaying of the plurality of AR images may include distinguishing a plurality of objects displayed on the surrounding image, extracting coordinate information of each of the plurality of objects, transmitting the coordinate information to an external server through wireless communication, generating a plurality of AR images related to the coordinate information in the external server, and transmitting the plurality of AR images to the vehicle through the wireless communication.

The generating of the window may include selecting an AR image overlapping a vanishing line or vanishing point of the surrounding image from among the plurality of AR images, setting the first area including an AR image overlapping at least one of the selected AR images, and adjusting a size of the first area based on a size of the window.

The adjusting may include calculating a scale ratio at which the size of the first area can be included in the size of the window and displaying the first area on the window based on the calculated scale ratio.

The generating of the window may include converting the first area into a two-dimensional image, and displaying the converted two-dimensional image on the window.

The displaying of the converted two-dimensional image on the window may include calculating a scale ratio at which a size of the converted two-dimensional image can be included in the window, converting the converted two-dimensional image into a 2.5-dimensional image based on the calculated scale ratio being greater than a preset threshold, and displaying the converted 2.5-dimensional image on the window.

The generating a window may display a background including a planar map or a satellite image related to the first area, and information about a road on which the vehicle is traveling and route guidance to a destination on the window in the overlapping manner.

The method may further include removing the window based on an overlap of the AR image being released.

The method may further include removing the window based on a distance between the vehicle and a destination being less than or equal to a preset distance.

The generating of the window may include setting a plurality of second areas each of which includes the plurality of AR images and setting the first area including the AR image overlapping at least one of the plurality of second areas.

The window may be positioned above a vanishing line or vanishing point of the surrounding image.

A width of the window may be equal to or greater than a length of a line formed by connecting two points at which the vanishing line meets a leftmost solid line and a rightmost solid line, both boundaries of a road on which the vehicle is traveling, being displayed on the surrounding image as the leftmost solid line and the rightmost solid line being.

The method may further include based on the window overlapping at least one of the plurality of AR images, deleting the at least one of the plurality of AR images overlapped with the window.

The external server and the vehicle may transmit information using V2X communication.

In addition, in order to solve the above problems, the present disclosure may include a camera configured to photograph a surrounding image of a vehicle, a position data generation device configured to generate current position data of the vehicle, a processor configured to calculate coordinate information of each of a plurality of objects displayed on the surrounding image based on the position data and the surrounding image, an external server configured to receive the coordinate information through wireless communication and generate a plurality of AR images related to the coordinate information, a communication device configured to receive the plurality of AR images from the external server through the wireless communication, and a display configured to display the surrounding image and the plurality of AR images, wherein the external server may generate a window separately displaying a first area including an AR image overlapping at least one of the plurality of AR images, and transmit the window to the communication device, and the display may display the surrounding image, the plurality of AR images, and the window in an overlapping manner.

In this case, the external server and the communication device may transmit information using V2X communication.

In addition, the external server may select an AR image overlapping a vanishing line or vanishing point of the surrounding image from among the plurality of AR images, set the first area including an AR image overlapping at least one of the selected AR images, and adjust a size of the first area based on a size of the window.

In addition, the external server may convert the first area into a two-dimensional image, and display the converted two-dimensional image on the window.

In this case, the external server may calculate a scale ratio at which a size of the converted two-dimensional image can be included in the window, convert the converted two-dimensional image into a 2.5-dimensional image based on the calculated scale ratio being greater than a preset threshold, and display the converted 2.5-dimensional image on the window.

In addition, the external server may remove the window based on an overlap of the AR image being released.

Advantageous Effects

In case of recognition being difficult due to overlapping AR images, etc., the present disclosure has an effect of enhancing user convenience and promoting safe vehicle operation by utilizing a window.

In addition, the present disclosure proposes a condition for determining whether recognition is difficult due to overlapping AR images, etc., so that the present disclosure has an effect of more quickly determining whether it is difficult for a user to recognize an AR image or the like.

In addition, the present disclosure proposes a window including an optimized size, position, and content, so that the present disclosure has an effect that the user can more easily recognize the AR image to promote safe driving.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

FIG. 1 is a block diagram of a wireless communication system to which methods proposed in the disclosure are applicable.

FIG. 2 is a diagram showing an example of a signal transmission/reception method in a wireless communication system.

FIG. 3 shows an example of basic operations of an autonomous vehicle and a 5G network in a 5G communication system.

FIG. 4 shows an example of a basic operation between vehicles using 5G communication.

FIG. 5 is a view illustrating V2X communication to which the present disclosure may be applied.

FIG. 6 illustrates a resource allocation method in a sidelink in which V2X is used.

FIG. 7 is a view illustrating a procedure for a broadcast mode of V2X communication using PC5.

FIG. 8 is a diagram illustrating a vehicle including an autonomous device.

FIG. 9 is a control block diagram of a vehicle according to an autonomous device.

FIG. 10 is a diagram illustrating a method of displaying AR navigation screen according to a first embodiment of the present disclosure.

FIG. 11 is a diagram illustrating step S1000 according to a first embodiment of the present disclosure.

FIGS. 12A, 12B and 12C are diagrams illustrating overlapping AR images with surrounding images of a vehicle according to a first embodiment of the present disclosure.

FIGS. 13A, 13B and 13C are diagrams illustrating that a window is generated and overlapped on a screen when AR images are overlapped according to a first embodiment of the present disclosure.

FIG. 14 is a diagram illustrating step S2000 according to a first embodiment of the present disclosure.

FIG. 15 is a diagram illustrating step S2030 according to a first embodiment of the present disclosure.

FIGS. 16A, 16B and 16C are diagrams illustrating that a window is generated based on a first area and overlapped on a screen according to a first embodiment of the present disclosure.

FIG. 17 is a diagram illustrating step S2000 according to a first embodiment of the present disclosure.

FIGS. 18A, 18B and 18C are diagrams illustrating changing a window from 2D to 2.5D according to a first embodiment of the present disclosure.

FIG. 19 is a diagram illustrating step S2000 according to a first embodiment of the present disclosure.

FIGS. 20A and 20B are diagrams illustrating setting of a second area according to a first embodiment of the present disclosure.

FIGS. 21A and 21B is a diagram illustrating an example of generating a window according to a first embodiment of the present disclosure.

FIGS. 22A, 22B and 22C are diagrams illustrating a process of setting a size and position of a window according to a first embodiment of the present disclosure.

FIG. 23 is a table showing whether a window is displayed for each type of road according to a first embodiment of the present disclosure.

FIGS. 24 to 27 are diagrams sequentially illustrating a specific actual example of displaying a window on a general road according to a first embodiment of the present disclosure.

FIG. 28 is a diagram illustrating an AR navigation system according to a second embodiment of the present disclosure.

The accompanying drawings, which are included as a part of the detailed description to help the understanding of the present disclosure, provide embodiments of the present disclosure, and describe the technical features of the present disclosure together with the detailed description.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of block diagram of UE and 5G network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 may perform detailed autonomous operations.

A 5G network including another vehicle communicating with the autonomous device is defined as a second communication device (920 of FIG. 1), and a processor 921 may perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE may receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE may acquire broadcast information in the cell by receiving a physical broadcast channel (PBCH) from the BS. Further, the UE may receive a downlink reference signal (DL RS) in the initial cell search step to check a downlink channel state. After initial cell search, the UE may acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE may perform a random access procedure (RACH) for the BS (steps S203 to S206). To this end, the UE may transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE may perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network may configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH may be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE may perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity may be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure may be used for network initial access, handover, and UE-triggered UL data transmission. A UE may acquire UL synchronization and UL transmission resources through the random access procedure. The random access procedure is classified into a contention-based random access procedure and a contention-free random access procedure. A detailed procedure for the contention-based random access procedure is as follows.

A UE may transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE may receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE may be determined according to presence or absence of a random access preamble ID with respect to the preamble transmitted by the UE. If there is no response to Msg1, the UE may retransmit the RACH preamble less than a predetermined number of times while performing power ramping. The UE calculates PRACH transmission power for preamble retransmission on the basis of most recent pathloss and a power ramping counter.

The UE may perform UL transmission through Msg3 of the random access procedure over a physical uplink shared channel on the basis of the random access response information. Msg3 may include an RRC connection request and a UE ID. The network may transmit Msg4 as a response to Msg3, and Msg4 may be handled as a contention resolution message on DL. The UE may enter an RRC connected state by receiving Msg4.

C. Beam Management (BM) Procedure of 5G Communication System

A BM procedure may be divided into (1) a DL MB procedure using an SSB or a CSI-RS and (2) a UL BM procedure using a sounding reference signal (SRS). In addition, each BM procedure may include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set may be set as {SSBx1, SSBx2, SSBx3, SSBx4, . . . }. An SSB index may be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE may assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam may be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE may skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and may be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR may refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services may be scheduled on non-overlapping time/frequency resources, and URLLC transmission may occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE may assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information may be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network may determine whether to remotely control the vehicle (S2). Here, the 5G network may include a server or a module which performs remote control related to autonomous driving. In addition, the 5G network may transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network may transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network may transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle may receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle may receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information may be transmitted through a narrowband of 6 resource blocks (RBs) or 1 RB.

H. Autonomous Driving Operation Between Vehicles Using 5G Communication

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network may transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

V2X (Vehicle-to-Everything)

FIG. 5 is a view illustrating V2X communication to which the present disclosure may be applied.

V2X communication refers to communication between a vehicle and all entities such as vehicle-to-Vehicle (V2V) designating communication between vehicles, vehicle-to-infrastructure (V2I) designating communication between a vehicle and an eNB or a road side unit (RSU), communication between a vehicle and an individual (pedestrian, bicyclist, driver, or passenger), vehicle-to-network (V2N), and the like.

The V2X communication may have the same meaning as or broader meaning than a V2X sidelink or the NR V2X.

V2X communication may be applicable to various services such as forward collision warning, automatic parking system, cooperative adaptive cruise control (CACC), control loss warning, traffic matrix warning, traffic vulnerable safety warning, emergency vehicle warning, speed warning on curved road, and traffic flow control and the like.

V2X communication may be provided via a PC5 interface and/or a Uu interface. In this case, in a wireless communication system supporting V2X communication, specific network entities for supporting communication between a vehicle and all entities. For example, the network entities may include a BS (eNB), a road side unit (RSU), a UE, an application server (e.g., a traffic safety server), and the like.

In addition, a UE performing V2X communication may be a vehicle UE (V-UE), a pedestrian UE, and a BS type (eNB type) RSU, a UE type RSU, a robot having a communication module, or the like, as well as a general handheld UE.

V2X communication may be performed directly between UEs or may be performed through the network entity(s). A V2X driving mode may be classified according to a method of performing V2X communication.

V2X communication V2X communication is required to support pseudonymity and privacy of a UE at the time of using the V2X application so that an operator or a third party cannot track a UE identifier within an area where the V2X is supported.

Terms frequently used in V2X communication are defined as follows.

RSU (Road Side Unit): RSU is a V2X-enabled unit capable of performing transmission and reception with a moving vehicle using a V2I service. The RSU is a fixed infrastructure entity that supports V2X applications and may exchange messages with other entities that support V2X applications. The RSU is a commonly used term in the existing ITS specification, and the reason for introducing the RSU in the 3GPP specification is to make a document easier to read in an ITS industry. The RSU is a logical entity that combines a V2X application logic with functionality of a BS (called a BS-type RSU) or a UE (called a UE-type RSU).

V2I service: A type of V2X service in which one side is a vehicle and the other side belongs to an infrastructure.

V2P service: A type of V2X service in which one side is a vehicle and the other side is a device carried by an individual (e.g., a handheld UE device carried by a pedestrian, a cyclist, a driver, or a passenger).

V2X service: A type of 3GPP communication service in which a transmitting or receiving device is involved in a vehicle.

V2X enabled UE: A UE supporting the V2X service.

V2V service: A type of V2X service in which both are vehicles.

V2V communication range: A range of direct communication between two vehicles participating in the V2V service.

The V2X application, called vehicle-to-everything (V2X), includes four types of (1) vehicle-to-vehicle (V2V), (2) vehicle-to-infrastructure (V2I), (3) vehicle-to-network (V2N), and (4) vehicle-to-pedestrian (V2P).

FIG. 6 illustrates a resource allocation method in a sidelink in which V2X is used.

In a sidelink, different physical sidelink control channels (PSCCHs) may be allocated to be spaced apart from each other in a frequency domain and different physical sidelink shared channels (PSSCHs) may be allocated to be spaced apart from each other. Alternatively, different PSCCHs may be allocated in succession in the frequency domain and PSSCHs may also be allocated in succession in the frequency domain.

NR V2X

Support for V2V and V2X services in LTE was introduced to extend the 3GPP platform to the automotive industry during 3GPP releases 14 and 15.

Requirements for supporting enhanced V2X use cases are largely classified into four use case groups.

(1) Vehicle platooning enables a platoon in which vehicles move together to be dynamically formed. All the vehicles of the platoon obtain information from a lead vehicle to manage the platoon. The information allows the vehicles to drive more harmoniously in a normal direction and go in the same direction and drive together.

(2) Extended sensors allow row data or processed data collected via local sensors or live video images to be exchanged in vehicles, road site units, pedestrian devices, and V2X application servers. Vehicles may raise environmental awareness beyond what their sensors may detect, and more extensively and generally recognize a local situation. A high data rate is one of main features.

(3) Advanced driving enables semi-automatic or fully-automatic driving. It allows each vehicle and/or RSU shares self-awareness data obtained from local sensors with nearby vehicles and allow each vehicle to synchronize and coordinate trajectory or manoeuvre. Each vehicle shares a driving intent with a vehicle which drives nearby.

(4) Remote driving allows a remote driver or V2X application to drive a remote vehicle for passengers who are unable to drive on their own or in a remote vehicle in a hazardous environment. If fluctuations are limited and a route may be predicted such as public transportation, driving based on cloud computing may be used. High reliability and low standby time are key requirements.

Identifier for V2X Communication Via PC5

Each terminal (or user equipment (UE)) has a Layer-2 identifier for V2 communication through one or more PC5. This includes a source Layer-2 ID and a destination Layer-2 ID.

The source and destination Layer-2 IDs are included in a Layer-2 frame, and the Layer-2 frame is transmitted through a layer-2 link of PC5 identifying a source and a destination of Layer-2 on a frame.

The source and destination Layer-2 ID selection of a UE is based on a communication mode of the V2X communication of the PC5 of the layer-2 link. The source Layer-2 ID may differ between different communication modes.

If IP-based V2X communication is allowed, the UE is configured to use a link local IPv6 address as a source IP address. The UE may use the IP address for V2X communication of PC5, even without sending a Neighbor Solicitation and Neighbor Advertisement message for searching for duplicate addresses.

If one UE has an active V2X application that requires personal information protection supported in a current geographic area, the source Layer-2 ID may change over time and be randomized in order for the source UE (e.g., vehicle) to be tracked or identified from another UE only for a certain time. In the case of IP-based V2X communications, the source IP address must also change over time and be randomized.

Changes in identifiers of the source UE should be synchronized in a layer used for PC5. In other words, if an application layer identifier is changed, the source Layer-2 ID and the source IP address are also required to be changed.

Broadcast Mode

FIG. 7 is a view illustrating a procedure for a broadcast mode of V2X communication using PC5.

1. A receiving UE determines a destination Layer-2 ID for broadcast reception. The destination Layer-2 ID is transmitted to an AS layer of the receiving UE for reception.

2. A V2X application layer of a transmitting UE may provide a data unit and provide V2X application requirements.

3. The transmitting UE determines the destination Layer-2 ID for broadcast. The transmitting UE self-assigns a source Layer-2 ID.

4. One broadcast message transmitted by the transmitting UE transmits V2X service data using the source Layer-2 ID and the destination Layer-2 ID.

Driving (1) Exterior of Vehicle

FIG. 8 is a diagram showing a vehicle according to an embodiment of the present disclosure.

Referring to FIG. 8, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

FIG. 9 is a control block diagram of the vehicle according to an embodiment of the present disclosure.

Referring to FIG. 9, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 may receive user input and provide information generated in the vehicle 10 to the user. The vehicle 10 may realize a user interface (UI) or user experience (UX) through the user interface device 200. The user interface device 200 may include an input device, an output device and a user monitoring device.

2) Object Detection Device

The object detection device 210 may generate information about objects outside the vehicle 10. Information about an object may include at least one of information on presence or absence of the object, positional information of the object, information on a distance between the vehicle 10 and the object, and information on a relative speed of the vehicle 10 with respect to the object. The object detection device 210 may detect objects outside the vehicle 10. The object detection device 210 may include at least one sensor which may detect objects outside the vehicle 10. The object detection device 210 may include at least one of a camera 12, a radar, a lidar, an ultrasonic sensor and an infrared sensor. The object detection device 210 may provide data about an object generated on the basis of a sensing signal generated from a sensor to at least one electronic device included in the vehicle 10.

2.1) Camera

The camera 12 may generate information about objects outside the vehicle 10 using images. The camera 12 may include at least one lens, at least one image sensor, and at least one processor which is electrically connected to the image sensor, processes received signals and generates data about objects on the basis of the processed signals.

The camera 12 may be at least one of a mono camera 12, a stereo camera 12 and an around view monitoring (AVM) camera 12. The camera 12 may acquire positional data of objects, information on distances to objects, or information on relative speeds with respect to objects using various image processing algorithms. For example, the camera 12 may acquire information on a distance to an object and information on a relative speed with respect to the object from an obtained image on the basis of change in the size of the object over time. For example, the camera 12 may acquire information on a distance to an object and information on a relative speed with respect to the object through a pin-hole model, road profiling, or the like. For example, the camera 12 may acquire information on a distance to an object and information on a relative speed with respect to the object from a stereo image obtained from a stereo camera on the basis of disparity information.

The camera 12 may be attached at a portion of the vehicle 10 at which FOV (field of view) may be secured in order to photograph the outside of the vehicle. The camera 12 may be disposed in proximity to the front windshield inside the vehicle 10 in order to acquire front view images of the vehicle 10. The camera 12 may be disposed near a front bumper or a radiator grill. The camera 12 may be disposed in proximity to a rear glass inside the vehicle in order to acquire rear view images of the vehicle 10. The camera 12 may be disposed near a rear bumper, a trunk or a tail gate. The camera 12 may be disposed in proximity to at least one of side windows inside the vehicle 10 in order to acquire side view images of the vehicle 10. Alternatively, the camera 12 may be disposed near a side mirror, a fender or a door.

2.2) Radar

The radar may generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar may detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle 10 in order to detect objects positioned in front of, behind or on the side of the vehicle 10.

2.3) Lidar

The lidar may generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle 10 according to light steering. The vehicle 10 may include a plurality of non-drive type lidars. The lidar may detect an object through a laser beam on the basis of TOF (Time of Flight) or phase shift and detect the position of the detected object, a distance to the detected object and a relative speed with respect to the detected object. The lidar may be disposed at an appropriate position outside the vehicle 10 in order to detect objects positioned in front of, behind or on the side of the vehicle 10.

3) Communication Device

The communication device 220 may exchange signals with devices disposed outside the vehicle 10. The communication device 220 may exchange signals with at least one of infrastructure (e.g., a server and a broadcast station), another vehicle 10 and a terminal. The communication device 220 may include a transmission antenna, a reception antenna, and at least one of a radio frequency (RF) circuit and an RF element which may implement various communication protocols in order to perform communication.

For example, the communication device 220 may exchange signals with external devices on the basis of C-V2X (Cellular V2X). For example, C-V2X may include sidelink communication on the basis of LTE and/or sidelink communication on the basis of NR. Details related to C-V2X will be described later.

For example, the communication device 220 may exchange signals with external devices on the basis of DSRC (Dedicated Short Range Communications) or WAVE (Wireless Access in Vehicular Environment) standards on the basis of IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transfer rate in the range of 3 Mbps to 27 Mbps. IEEE 802.11p may be combined with IEEE 1609 to support DSRC (or WAVE standards).

The communication device 220 of the present disclosure may exchange signals with external devices using only one of C-V2X and DSRC. Alternatively, the communication device 220 of the present disclosure may exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 may control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 may control vehicle driving devices on the basis of signals received by the autonomous device 260. For example, the driving control device 250 may control a power train, a steering device and a brake device on the basis of signals received by the autonomous device 260.

7) Autonomous Device

The autonomous device 260 may generate a route for self-driving on the basis of obtained data. The autonomous device 260 may generate a driving plan for traveling along the generated route. The autonomous device 260 may generate a signal for controlling movement of the vehicle 10 according to the driving plan. The autonomous device 260 may provide the signal to the driving control device 250.

The autonomous device 260 may implement at least one ADAS (Advanced Driver Assistance System) function. The ADAS may implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 may perform switching from a self-driving mode to a manual driving mode or switching from the manual driving mode to the self-driving mode. For example, the autonomous device 260 may switch the mode of the vehicle 10 from the self-driving mode to the manual driving mode or from the manual driving mode to the self-driving mode on the basis of a signal received from the user interface device 200.

8) Sensing Unit

The sensing unit 270 may detect a state of the vehicle 10. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 may generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 may generate position data of the vehicle 10. The position data generation device 280 may include at least one of a global positioning system (GPS) and a differential global positioning system (DGPS). The position data generation device 280 may generate position data of the vehicle 10 on the basis of a signal generated from at least one of the GPS and the DGPS. According to an embodiment, the position data generation device 280 may correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

AR Navigation

'Augmented Reality (AR)' refers to a technology that synthesizes virtual objects or information in the real environment to make them look like objects existing in the original environment, that is, a technology that shows 3D virtual objects overlaid on the real world. Unlike conventional virtual reality (VR), which targets only virtual space and virtual objects, the augmented reality has a feature of supplementing and providing additional information that is difficult to obtain only in the real world by synthesizing virtual objects on the basis of the real world.

'Navigation' is a road and traffic information providing system that guides along the optimal route selected by considering the distance and traffic conditions from the current position to the destination, and has become more common due to the increased demand for its various conveniences and functions. Although there are various types of navigation, in general, the type of navigation is configured in a way that is displayed on a two-dimensional map screen by obtaining the current vehicle position information from 4 or more satellites in the GPS receiver, using the position information and the pre-established electronic map data, and using map matching technology.

'Augmented reality navigation' refers to navigation implemented using an augmented reality technique that uses a camera 12 attached to the vehicle 10 to capture an image of a road currently driving, and overlays a virtual route line on the image screen of the road. That is, it may be a system that expresses a destination or a point of interest based on a GPS sensor, a magnetic field sensor, an orientation sensor, etc. in the background of the actual image viewed through the camera 12.

Method of Displaying AR Navigation Screen

Hereinafter, according to a first preferred embodiment of the present disclosure based on the above-mentioned content, a method of displaying AR navigation screen will be described in detail as follows.

In addition, the method of displaying AR navigation screen according to the first embodiment of the present disclosure may be used in AR navigation for the vehicle 10 or a system thereof, and preferably can be implemented in an AR navigation system according to a second embodiment of the present disclosure.

FIG. 10 is a diagram illustrating a method of displaying AR navigation screen according to a first embodiment of the present disclosure.

Referring to FIG. 10, the method of displaying AR navigation screen according to the first embodiment of the present disclosure may include displaying a surrounding image of a vehicle and a plurality of AR images related to the surrounding image in an overlapping manner (S1000), generating a window separately displaying a first area including an AR image overlapping at least one of the plurality of AR images (S2000), and displaying the generated window to the surrounding image of the vehicle 10 in the overlapping manner (S3000).

Also, according to FIG. 10, the method of displaying AR navigation screen according to the first embodiment of the present disclosure may further include removing the window based on an overlap of a plurality of AR images being released (S4000).

In addition, step S4000 may be removing the window based on a distance between the vehicle 10 and a destination being less than or equal to a preset distance. In this case, a detailed description related to the preset distance will be described later in detail with reference to FIGS. 23 to 27. In this case, the destination may be a final destination to which the vehicle 10 intends to arrive, or an intermediate destination (e.g.—an intersection) to be passed through to reach the final destination.

Since there is a limit to displaying all of the plurality of AR images on the display 14, some may be selected and displayed. That is, a part may be selected based on the distances between the vehicle 10 and the plurality of AR images, and may be displayed or removed based on a relationship with other AR images. That is, based on the importance of a plurality of AR images being quantified and set in advance, and in case of some of the AR images overlapping or being displayed in the overlapping manner, only AR images with higher quantified importance may be displayed.

FIG. 11 is a diagram illustrating step S1000 according to a first embodiment of the present disclosure.

Referring to FIG. 11, the step S1000 according to the first embodiment of the present disclosure may include distinguishing a plurality of objects displayed on the surrounding image of the vehicle 10 (S1010), extracting coordinate information of each of the plurality of distinguished objects (S1020), transmitting the extracted coordinate information to an external server 30 through wireless communication (S1030), generating a plurality of AR images related to the extracted coordinate information by the external server 30 (S1040), and transmitting the plurality of generated AR images to the vehicle 10 through the wireless communication (S1050).

At this time, the wireless communication used may use the above-described V2X communication or the above-described 5G communication. In addition, the wireless communication may refer to communication using a communication facility installed by telecommunication companies and a wireless communication network using the frequency. That is, it may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and the like, as well as 3rd generation partnership project (3GPP) long term evolution (LTE) may be used. In addition, not only 5G communication, but also 6G, which is scheduled to be commercialized in the future, may be used. However, in the present disclosure, the installed communication network may be utilized without being limited by such a wireless communication method.

FIGS. 12A to 12C are diagrams illustrating overlapping AR images with surrounding images of a vehicle according to a first embodiment of the present disclosure.

FIG. 12A is a diagram illustrating a surrounding image of the vehicle 10 according to the first embodiment of the present disclosure, FIG. 12B is a diagram illustrating a plurality of AR images according to the first embodiment of the present disclosure, and FIG. 12C is a diagram illustrating a surrounding image of the vehicle 10 and a plurality of AR images in an overlapping manner according to the first embodiment of the present disclosure.

Based on FIG. 12A, the surrounding image of the vehicle 10 includes a vanishing line and a vanishing point. The vanishing line refers to a line passing through a vanishing point, and the vanishing point may refer to a fixed point behind the background when a line that is actually parallel in perspective is drawn non-parallel. In general, one vanishing point occurs in the driving image of the vehicle 10. However, a plurality of vanishing points may exist depending on the type of perspective. For example, 1 to 3 vanishing points may be drawn in perspective projection, and 5 vanishing points may be drawn in curved perspective.

Also, the surrounding image of the vehicle 10 of FIG. 12A may mean an image obtained by the above-described camera 12 photographing the outside of the vehicle 10. In this case, it is preferable that the surrounding image of the vehicle 10 is an image taken from the front of the vehicle 10.

The method of displaying AR navigation screen according to the first embodiment of the present disclosure is described based on one vanishing point, but the scope of the present disclosure is not limited thereto, and may be implemented even if it has a plurality of vanishing points.

Based on FIG. 12B, a plurality of AR images may be generated based on the order shown in FIG. 11. The plurality of AR images may be predetermined icons, markers, or images for guiding the traveling direction of the vehicle 10 based on coordinate information of objects in the surrounding image of the vehicle 10. In particular, the image indicating the traveling direction of the vehicle 10 may be an arrow, and may indicate a point at which a direction should be changed, such as an intersection. In addition, the arrow may indicate a lane in which the vehicle 10 should travel, a direction of rotation at an intersection, and the like, and may be a straight arrow or a curved arrow, and the like, if necessary. As described above, the image for guiding the traveling direction of the vehicle 10 is implemented as an AR image and displayed in the vicinity of the vanishing point, so that the user can easily recognize it.

Based on FIG. 12C, the surrounding image of the vehicle 10 and the plurality of AR images are displayed together in the overlapping manner. By implementing the information on the object displayed on the surrounding image of the vehicle 10 as the AR images as described above, the user can easily visually recognize information on the plurality of objects.

FIGS. 13A to 13C are diagrams illustrating that a window is generated and overlapped on a screen when AR images are overlapped according to a first embodiment of the present disclosure.

FIG. 13A is a screen in which a surrounding image of a vehicle 10 and a plurality of AR images are displayed in an overlapping manner according to the first embodiment of the present disclosure, FIG. 13B is a window generated according to the first embodiment of the present disclosure, and FIG. 13C is a diagram illustrating a screen in which the screen of FIG. 13A and the window of FIG. 13B are displayed in an overlapping manner according to the first embodiment of the present disclosure.

Based on FIG. 13A, since a plurality of objects are displayed contiguously to the vanishing point, a plurality of AR images related to coordinate information of the plurality of objects may be displayed in the overlapping manner. In this case, it is preferable that the image for guiding the traveling direction of the vehicle 10 is expressed with priority over AR images including other information. This is because information about the traveling direction of the vehicle 10 is the most important rather than information about the surrounding environment.

Due to the characteristics of perspective, images may be drawn small near the vanishing point, so the plurality of objects may be displayed small near the vanishing point. Due to this characteristic, the AR images related to the plurality of objects may be displayed in the overlapping manner, and based on the AR images being displayed in the overlapping manner, the user may not be able to properly identify the AR images.

Also, there may be a problem in that resources are excessively consumed to calculate whether the AR images are actually displayed in the overlapping manner. For this case, it may be determined that the plurality of AR images are collectively overlapped when the plurality of AR images are positioned near the vanishing line or vanishing point, without considering whether the plurality of AR images are actually displayed in the overlapping manner. In this case, it is preferable that the user may set what extent the plurality of AR images are positioned close to the vanishing line or the vanishing point to use a separate window. In this case, the setting may be set by quantifying a distance, a position, and a degree of overlap between the images and the vanishing line or vanishing point.

In addition, since there may be a problem in that resources are excessively consumed to calculate whether the AR images are actually displayed in the overlapping manner, it is possible to determine whether to display the window through another criterion. That is, it is possible to determine whether to display the window depending on the distance between the vehicle 10 and the destination. In this case, the destination may be not only the final destination of the route, but also an intermediate destination of the route (i.e. an intersection, a right/left turn section, etc.). A detailed method for this will be described later in detail with reference to FIGS. 23 to 27.

Based on FIG. 13B, a plurality of overlapping AR images may be displayed in a separate window (or floating window) to help the user's recognition. A specific method of forming the window of FIG. 13B will be described later.

Based on FIG. 13C, instead of displaying a plurality of overlapping AR images, a separate window may be displayed to specifically display guidance information indicating that an intersection exists and that a right turn is required at the intersection.

FIG. 14 is a diagram illustrating step S2000 according to a first embodiment of the present disclosure.

Based on FIG. 14, the generating of the window (S2000) may include selecting one or more AR images overlapping a vanishing line or vanishing point of the surrounding image of the vehicle 10 from among the plurality of AR images (S2010), setting the first area including an AR image overlapping at least one of the selected AR images (S2020), and adjusting a size of the first area based on a size of the window (S2030).

A shape of the first area may correspond to a shape of the window to be generated. In general, the window may have a square or rectangular shape. Accordingly, the shape of the first area may have a square or rectangular shape related to the window. However, the scope of the present disclosure is not limited to the shape of the first area and window.

FIG. 15 is a diagram illustrating step S2030 according to a first embodiment of the present disclosure, and FIGS. 16A to 16C are diagrams illustrating that a window is generated based on a first area and overlapped on a screen according to a first embodiment of the present disclosure.

Based on FIG. 15, the adjusting the size of the first area based on the size of the window (S2030) include calculating a scale ratio at which the size of the set first area can be included in the window (S2031), and displaying the first area on the window based on the calculated scale ratio (S2032).

FIG. 16A is a screen displaying a plurality of images on the surrounding image of the vehicle 10 in the overlapping manner, in which four or more AR images are shown.

Based on FIG. 16A, images (1), (2) and (4) are AR images including information on a plurality of objects, and image (3) is an AR image indicating the route direction of the vehicle 10. Based on FIG. 16A, image (1) overlaps image (3), and Image (3) overlaps image (1) and image (4). In this way, several images are overlapped, and the image 3 guiding the traveling direction of the vehicle 10 may not be properly recognized. However, the image (2) is positioned near another vanishing line and vanishing point, but does not overlap other AR images.

FIG. 16B is a diagram illustrating formation of a first area including a plurality of overlapped AR images.

Based on FIG. 16B, since images (1), (3), and (4) are overlapped, geographic information and route information of the overlapped images may be converted into a two-dimensional plane. At the converted two-dimensional plane, a first area including images (1), (3) and (4) may be set. The size of the first area may be appropriately adjusted and displayed in a separate window.

FIG. 16C is a diagram illustrating that a separate window is further displayed on a screen displaying the surrounding image of the vehicle 10 and a plurality of AR images in the overlapping manner.

Based on FIG. 16C, a window displays the first area, and the windows may be displayed in the overlapping manner on the portion of the screen where the images (1), (3) and (4) in the first area are displayed. In this case, the images (1), (3) and (4) of the existing screen may be removed.

Based on FIG. 16C, the window may also be overlapped with the image (2). Since the image (2) is not an image included in the first area, it may not be removed unlike other overlapped images. However, when the window and the image (2) are overlapped, the window may be displayed preferentially. The image (2) may be temporarily blocked by the window, but may be displayed again as the vehicle 10 moves to get closer to the image (2).

Through this, the user can easily recognize the route and at the same time, there is an effect that can significantly reduce the risk of accidents.

FIG. 17 is a diagram illustrating step S2000 according to a first embodiment of the present disclosure, and FIGS. 18A to 18C are diagrams illustrating changing a window from 2D to 2.5D according to a first embodiment of the present disclosure.

Based on FIG. 17, the generating of the window (S2000) may include converting the set first area into a two-dimensional image (S2110) and displaying the converted two-dimensional image on the window (S2120).

At this time, the displaying of the converted two-dimensional image on the window (S2120) may include calculating a scale ratio at which a size of the converted two-dimensional image can be included in the window (S2121), converting the converted two-dimensional image into a 2.5-dimensional image based on the calculated scale ratio being greater than a preset threshold (S2122), and displaying the converted 2.5-dimensional image on the window (S2123).

A scale means a scale on the map in general. It refers to a ratio between a distance between a and b on the map and the related actual distance between A and B, and can also be expressed as a fraction whose numerator is 1. A scale expressed as a fraction is called a scale fraction, and this denominator is called a scale denominator. In this case, the numerator is set to 1.

The scale ratio used in the present disclosure may mean a ratio of a distance on the map to an actual distance, and when the scale ratio is greater than a preset threshold value, it may mean that the content of the map is displayed smaller than a specific size.

The preset threshold value may be selected by whether the user easily recognizes it with the naked eye, and when the scale ratio is greater than the preset threshold value, it may mean that the map is displayed to an extent that is difficult for a user to recognize with the naked eye.

Two-dimensional (2D) means that the dimension is 2 as a dimension of a plane. 2.5D is also called pseudo 3D, which may mean displaying 3D data on the 2D plane based on perspective.

The two-dimensional (2D) may be formed in the external server 30 based on the coordinate information of the current position of the vehicle 10 and the coordinate information of each of a plurality of objects displayed in the surrounding image of the vehicle 10. That is, the two-dimensional map image may be transmitted from the external server 30 through wireless communication.

FIG. 18A is an AR navigation screen on which a window is displayed in a overlapping manner. Referring to FIG. 18A, since the scale ratio is calculated to be high, icons displayed on the internal map may not be recognized properly. However, in this case, based on the scale ratio being reduced again, some of the icon images may go off the screen and may not be visible.

FIG. 18B is a diagram illustrating conversion of a two-dimensional planar image into a 2.5-dimensional image. Converting the 2D planar image to the 2.5D image may be a resource-intensive operation. However, a 2.5-dimensional image may be efficiently constructed by simply rotating the two-dimensional plane by about 15 degrees.

FIG. 18C is a diagram illustrating an AR navigation screen based on a window of a 2.5-dimensional image. Based on the 2.5-dimensional image as described above, there is an effect that not only distance information to the vehicle 10 is easily recognized, but also the image including information positioned nearby is displayed in a larger size.

Through this, the user can easily recognize the route and at the same time, there is an effect that can significantly reduce the risk of accidents.

FIG. 19 is a diagram illustrating step S2000 according to a first embodiment of the present disclosure, and FIGS. 20A and 20B are diagrams illustrating setting of a second area according to a first embodiment of the present disclosure.

Referring to FIG. 19, the generating of the window (S2000) may includes setting a plurality of second areas each of which includes a plurality of AR images (S2310), and setting the first area including the AR image overlapping at least one of the plurality of set second areas (S2320).

Based on FIG. 20A, two images are shown and do not appear to overlap each other. However, based on FIG. 20B, the two images are surrounded by respective second areas, and the respective second areas overlap each other. That is, since each image has its own shape different from each other, there is a need for a clear criterion whether to overlap. In this case, as in the present disclosure, by setting the second area surrounding each image, whether or not overlapping may be uniformly determined.

In addition, in determining whether the plurality of AR images are overlapped, it may be determined that the plurality of AR images are overlapped only when the ratio of the area where each AR image overlaps is equal to or greater than a certain ratio. That is, although the plurality of AR images overlap a little so that a user can sufficiently identify them, generating a separate window may be a waste of resources.

As described above, in order to generate a window only when it includes an overlapping area over a certain ratio, it is preferable to form a uniform section like the second area of the present disclosure. Since the second area should overlap to such an extent that the user cannot identify it, the ratio of the overlapping area may be 30% to 90% of the total area of the second area, preferably about 70%.

FIGS. 21A and 21B are diagrams illustrating an example of generating a window according to a first embodiment of the present disclosure.

Based on FIG. 21A, a background image of the window may include a two-dimensional planar map image. Also, based on FIG. 21B, the background image of the window may be a satellite image captured by a satellite. The background image of the corresponding window may be selected by the user, and the data may be transmitted from the external server 30 based on wireless communication.

Through this, the user can easily recognize the route and at the same time, there is an effect that can significantly reduce the risk of accidents.

FIGS. 22A to 22C are diagrams illustrating a process of setting a size and position of a window according to a first embodiment of the present disclosure.

Based on FIG. 22A, images (1) to (7) are positioned near the vanishing line, and in this case, images (1) to (6) are AR images including information on a plurality of objects, and image (7) is an AR image representing the route direction of the vehicle 10.

Based on FIG. 22B, the size and position of the window may be determined. Basically, it is preferable that the window is positioned above the vanishing point or vanishing line.

Referring to FIG. 22B, the left side of the road may be referred to as a leftmost solid line, and the right side of the road may be referred to as a rightmost solid line with respect to the road on which the vehicle 10 is traveling. The leftmost solid line and the rightmost solid line may meet a vanishing line. In this case, it is preferable that the horizontal length of the window is greater than or equal to the length of a side where the leftmost solid line and the rightmost solid line meet the vanishing line (or the length between two points where they meet).

Based on FIG. 22B, it is preferable that the vertical length of the window is less than ½ of the vertical length of the surrounding image of the vehicle 10 or the screen of the AR navigation. In general, since the vanishing point or the vanishing line generally comes in the center of the screen, this vertical length limitation is for the window to be positioned above the vanishing point or vanishing line.

Based on FIG. 22C, it can be confirmed that the window satisfying the above conditions is displayed. That is, it is preferable that the window does not block the road on which the vehicle 10 is traveling.

Also, based on FIG. 22C, the window is preferably positioned in a space representing the sky above the horizon so as not to block the road on which the vehicle 10 is traveling. In addition, the window may be positioned in the upper left corner or upper right corner of the surrounding image of the vehicle 10 or the screen of the AR navigation so as not to block the road on which the vehicle 10 is traveling.

In this way, if the window is positioned in an area that does not block the road on which the vehicle 10 is traveling, the user may recognize the information displayed on the window at the same time as the road information. Through this, the user can easily recognize the route and at the same time, there is an effect that can significantly reduce the risk of accidents.

FIG. 23 is a table showing whether a window is displayed for each type of road according to a first embodiment of the present disclosure.

Based on FIG. 23, the road is largely divided into a general road, a main road, and a highway, and whether to display a window may be different for each type of road.

Based on FIG. 23, if an object does not exist near a vanishing point or a vanishing line, the window is not displayed.

Based on FIG. 23, on the general road, if the object exists near the vanishing point or vanishing line, it is preferable that an initial guidance through the window be performed at a point at which a distance of 100 to 200 m is left. In addition, it is preferable that the immediately preceding guidance through the window is performed at a point at which a distance of 100 to 50 m is left.

The initial guidance may be a guidance in which the window in which the first area is displayed is displayed above the vanishing point and the vanishing line. Preferably, the window may be displayed above the vanishing point and the vanishing line, and may be arranged in the center of the surrounding image of the vehicle 10 or the AR navigation screen.

The immediately preceding guidance may be a guidance displayed by moving the window in which the first area is displayed to a specific region. Preferably, the window may be positioned in the upper left corner or upper right corner of the surrounding image of the vehicle 10 or the AR navigation screen.

The end of the guidance may be removing of the window displayed in the immediately preceding guidance. This is because, when the destination is contiguous, emphasizing and displaying the surrounding image of the vehicle 10 may be more helpful for traveling. Accordingly, on the general road, the guidance is terminated at a point at which a distance of 50 m is left, and the window may be removed.

Based on FIG. 23, on the main road, when an object exists near the vanishing point or the vanishing line, it is preferable that the initial guidance through the window be performed at a point at which a distance of 200 to 500 m is left. In addition, it is preferable that the immediately preceding guidance through the window is performed at a point at which a distance of 100 to 200 m is left. In addition, it is preferable that the end of the guidance to remove the window is performed at a point at which a distance of 100 m is left.

Based on FIG. 23, on the highway, when an object exists near the vanishing point or vanishing line, it is preferable that the initial guidance through the window be performed at a point at which a distance of 500 to 1000 m is left. In addition, it is preferable that the immediately preceding guidance through the window is performed at a point at which a distance of 100 to 500 m is left. In addition, it is preferable that the end of the guidance to remove the window is performed at a point at which a distance of 100 m is left.

In this way, the classification of the guidance points by dividing into general roads (other roads, local roads), main roads (automobile-only roads), and highways for each type of road is related to the speed of the vehicle 10. For example, in the case of a highway, since the average speed of the vehicle 10 is faster than that in other roads, it is preferable that the initial guidance and the immediately preceding guidance are displayed faster than on other roads.

In addition, the reason that the guidance using the window ends before reaching the (intermediate) destination completely is because it is preferable to configure the screen so that the user can focus on the road screen rather than the window as the destination gets closer.

In this way, determining whether to generate and display the window may be determined based on the distance between the vehicle 10 and the destination, rather than based on whether the plurality of AR images overlap.

FIGS. 24 to 27 are diagrams illustrating a specific actual example of displaying a window on a general road according to a first embodiment of the present disclosure.

Specifically, FIG. 24 is a diagram illustrating a screen before displaying a window in a state in which 1.1 km is left to an intermediate destination, FIG. 25 is a diagram illustrating a screen displaying a window (initial guidance) in a state in which 150 m is left to an intermediate destination, FIG. 26 is a diagram illustrating a screen for moving and displaying a window (immediately preceding guidance) in a state in which 75 m is left to an intermediate destination. FIG. 27 is a diagram illustrating a screen removing a window in a state in which 40 m is left to an intermediate destination. In this case, the intermediate destination may be referred to as a place where a right turn can be made, such as an intersection.

In comparison with FIG. 23, the corresponding road is a general road, and the initial guidance is displayed at 200-100 m. That is, the window is not displayed in FIG. 24 because 1.1 km is left, and in FIG. 25, the window is displayed above the vanishing point and the vanishing line because the point is 150 m. In addition, the corresponding road is the general road, and the immediately preceding guidance is displayed when the point is 100 to 50 m. That is, since FIG. 26 is a point 75 m, the window has moved to the upper left corner, and since FIG. 27 is a point 40 m, the window has been removed.

AR Navigation System

Hereinafter, the AR navigation system according to a second preferred embodiment of the present disclosure will be described in detail as follows based on the above.

For reference, in the second embodiments of the present disclosure, descriptions of components having the same or similar features as those of the first embodiment of the present disclosure will be omitted and only differences will be described.

In addition, the AR navigation system according to the second embodiment of the present disclosure may use the method of displaying AR navigation screen according to the first embodiment of the present disclosure.

FIG. 28 is a diagram illustrating an AR navigation system according to a second embodiment of the present disclosure.

Referring to FIG. 28, an AR navigation system according to the second embodiment of the present disclosure may include a position data generation device 280, a camera 12, a processor 911, 13, a display 14, a communication device 220, and an external server 30.

The position data generation device 280 may generally mean a global positioning system (GPS) or the like. In this case, the GPS may refer to a device for obtaining position information of a current vehicle from four or more satellites at the receiver. It may include a global positioning system (GPS) in the United States, as well as a GLObalnaya NAvigatsionnaya Sputnikovaya Sistema (GLONASS) in Russia, a Galileo system in Europe, and a BeiDou system in China. In this way, the scope of the present disclosure is not limited to the type of system that generates position data.

The camera 12 may be mounted on the vehicle 10 in the same manner as described above.

The processor 911 and 13 is a configuration that can perform operations and control other devices. Mainly, it may mean a central processing unit (CPU), an application processor (AP), or the like. In addition, the CPU or AP may include one or more cores therein, and the CPU or AP may operate based on an operating voltage and a clock signal.

In addition, the processors 911 and 13 may be divided into a processor 911 for autonomous driving and a processor 13 for route guidance mounted in AR navigation. Although the present disclosure has been described focusing on the navigation processor 13, the present disclosure is not limited thereto, and the same operation may be performed in the processor 911 for autonomous driving in some cases.

The display 14 may be implemented with a light emitting diode (LED), an organic LED (OLED), a light emitting polymer (LEP) or a polymer LED (PLED), a liquid crystal display (LCD), a thin film transistor (TFT) LCD, a plasma, an electronic paper, an electronic ink, a combination thereof, or the like.

In addition, the display 14 may include a touch panel, so that a user (or a driver) may input a command through the display 14. In this case, a user interface may be displayed on the display 14.

The communication device 220 uses 5G in the same way as described above, and may be mounted on the vehicle 10. In the case of the communication device, it is connected to an internal/external antenna (not shown), and transmits/receives information to and from the base station through the antenna (not shown). The communication device 40 using wireless communication includes a wireless communication module (not shown) having a modulator, a demodulator, a signal processor, and the like.

The wireless communication refers to communication using a wireless communication network using the communication facility and the frequency installed by the communication companies. In this case, it may be used in various wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and the like, as well as 3rd generation partnership project (3GPP) long term evolution (LTE) may be used. In addition, 5G communication, which has been commercialized recently, can be mainly used, and 6G, which is scheduled to be commercialized in the future, may also be used. However, in the present disclosure, a pre-installed communication network may be utilized without being limited by such a wireless communication method.

The external server 30 may transmit/receive data based on the communication device 220 and V2X communication. In addition, the external server 30 may communicate with the communication device 220 through a Road Side Unit (RSU). At this time, the content of the V2X communication used are the same as those described above in FIGS. 5 to 7 and thus will be omitted.

Based on FIG. 28, a common processor, a first processor, and a second processor may be used until displayed on the display 14. The common processor may be used in common in both the first processor and the second processor. It shows the difference whether the first processor and the second processor overlap a plurality of screens and images in the external server 30, or the plurality of screens and images in the processor 13 inside the AR navigation.

Based on the first process of FIG. 28, the camera 12 may photograph a surrounding image of the vehicle 10. The camera 12 may be installed toward the front of the vehicle 10, and thus, the surrounding image of the vehicle 10 may be a front image of the vehicle 10.

Based on the first process of FIG. 28, the position data generation device 280 generates current position data of the vehicle 10. In this case, the position data may be current coordinate information of the vehicle 10.

Based on the first process of FIG. 28, the processor may calculate coordinate information of each of the plurality of objects displayed on the surrounding image of the vehicle 10 based on the position data of the vehicle 10 and the surrounding image of the vehicle 10.

Based on the first process of FIG. 28, the external server 30 may receive the position data of the vehicle 10 and the coordinate information of the plurality of objects through wireless communication, and generate a plurality of AR images related to the plurality of objects or the coordinate information of the plurality of objects.

In this case, the external server 30 may set the first area including the AR image overlapping at least one of the plurality of AR images. In addition, the external server 30 may generate a window separately displaying the set first area, and transmit the generated window to the communication device 220.

In addition, the external server 30 may select one or more AR images overlapping a vanishing line or vanishing point of the surrounding image of the vehicle 10 from among the plurality of generated AR images. In addition, it may set the first area including an AR image overlapping at least one of the selected AR images, and may adjust a size of the set first area based on a size of the window.

In addition, the external server 30 may convert the set first area into a two-dimensional image, and display the converted two-dimensional image on the window.

In addition, the external server 30 may calculate a scale ratio at which a size of the converted two-dimensional image can be included in the window, convert the converted two-dimensional image into a 2.5-dimensional image based on the calculated scale ratio being greater than a preset threshold, and display the converted 2.5-dimensional image on the window. In this case, the preset threshold may mean, based on displaying on the window using the same scale ratio as the threshold, a scale ratio value that takes more than a specific time (ex-1 second) for a general user (or general driver) to recognize images displayed on the window.

In addition, the external server 30 may remove the window based on an overlap of the AR image being released.

In addition, it is obvious that the external server 30 may perform all the processes of generating the window according to the first embodiment of the present disclosure.

Based on the present disclosure, the communication device 220 may receive the plurality of generated AR images through the wireless communication, and the display 14 may display the surrounding image of the vehicle 10 and the plurality of transmitted AR images in an overlapping manner.

Based on the second process of FIG. 28, the surrounding image of the vehicle 10 photographed by the camera 12, the plurality of AR images generated by the external server 30, and the window generated by the external server 30 may be combined into one screen in the processor 13 of the AR navigation.

The above-described present disclosure can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g., transmission over the internet). Accordingly, the above detailed description should not be construed in all aspects as limiting, and be considered illustrative. The scope of the present disclosure should be determined by rational interpretation of the appended claims, and all supplements within the equivalent range of the present disclosure are included in the scope of the present disclosure.

In addition, although the embodiments have been mainly described above, these are merely examples and are not intended to limit the present disclosure, and those of ordinary skill in the art to which the present disclosure pertains will appreciate that various modifications and applications not exemplified above are possible without departing from the essential characteristics of the present embodiment. For example, each element specifically shown in the embodiments may be implemented by modification. And differences related to such modifications and applications should be construed as being included in the scope of the present disclosure defined in the appended claims.

EXPLANATION OF SYMBOLS

12: Camera
13: Processor
14: Display
30: External server
220: Communication device
280: Position data generation device

The invention claimed is:

1. A method of displaying an augmented reality (AR) navigation screen comprising:
    displaying, on a display device, a surrounding image of a vehicle and a plurality of AR images related to the surrounding image in an overlapping manner;
    generating a window separately displaying a first area including a particular AR image overlapping at least one of the plurality of AR images; and
    displaying, on the display device, the window relative to the surrounding image in the overlapping manner,
    wherein the generating of the window includes:
    selecting AR images overlapping a vanishing line or vanishing point of the surrounding image from among the plurality of AR images;
    setting the first area including an AR image overlapping at least one of the selected AR images; and
    adjusting a size of the first area based on a size of the window.

2. The method of claim 1, wherein the plurality of AR images are respectively related to a plurality of objects displayed on the surrounding image and respectively displayed at positions corresponding to coordinates of the plurality of objects.

3. The method of claim 1, wherein the displaying of the plurality of AR images includes:
    distinguishing a plurality of objects displayed on the surrounding image;
    extracting coordinate information of each of the plurality of objects;
    transmitting the coordinate information to an external server through wireless communication;
    generating the plurality of AR images related to the coordinate information in the external server; and
    transmitting the plurality of AR images to the vehicle through the wireless communication.

4. The method of claim 3, wherein the external server and the vehicle transmit information using vehicle-to-everything (V2X) communication.

5. The method of claim 1, wherein the adjusting includes:
    calculating a scale ratio at which the size of the first area can be included in the size of the window; and
    displaying the first area on the window based on the calculated scale ratio.

6. The method of claim 1, wherein further comprising:
    removing the window based on an overlap of the particular AR image being released.

7. The method of claim 1, wherein further comprising:
    removing the window based on a distance between the vehicle and a destination being less than or equal to a preset distance.

8. The method of claim 1, wherein the generating of the window includes:
    setting a plurality of second areas each of which includes the plurality of AR images; and
    setting the first area including the particular AR image overlapping at least one of the plurality of second areas.

9. A method of displaying an augmented reality (AR) navigation screen comprising:
    displaying, on a display device, a surrounding image of a vehicle and a plurality of AR images related to the surrounding image in an overlapping manner;
    generating a window separately displaying a first area including a particular AR image overlapping at least one of the plurality of AR images; and
    displaying, on the display device, the window relative to the surrounding image in the overlapping manner,
    wherein the generating of the window includes:
    converting the first area into a two-dimensional image; and
    displaying the converted two-dimensional image on the window, and wherein the displaying of the converted two-dimensional image on the window includes:
calculating a scale ratio at which a size of the converted two-dimensional image can be included in the window;
converting the converted two-dimensional image into a 2.5-dimensional image based on the calculated scale ratio being greater than a preset threshold; and
displaying the converted 2.5-dimensional image on the window.

10. A method of displaying an augmented reality (AR) navigation screen comprising:
displaying, on a display device, a surrounding image of a vehicle and a plurality of AR images related to the surrounding image in an overlapping manner;
generating a window separately displaying a first area including a particular AR image overlapping at least one of the plurality of AR images; and
displaying, on the display device, the window relative to the surrounding image in the overlapping manner,
wherein the window is positioned above a vanishing line or vanishing point of the surrounding image, and
wherein a width of the window is equal to or greater than a length of a line formed by connecting two points at which the vanishing line meets a leftmost solid line and a rightmost solid line, both boundaries of a road on which the vehicle is traveling, being displayed on the surrounding image as the leftmost solid line and the rightmost solid line.

11. The method of claim 10, wherein further comprising:
based on the window overlapping the at least one of the plurality of AR images, deleting the at least one of the plurality of AR images overlapped with the window.

12. An augmented reality (AR) navigation system comprising:
a camera configured to photograph a surrounding image of a vehicle;
a position data generation device configured to generate current position data of the vehicle;
a processor configured to calculate coordinate information of each of a plurality of objects displayed on the surrounding image based on the current position data and the surrounding image;
an external server configured to receive the coordinate information through wireless communication and generate a plurality of AR images related to the coordinate information;
a communication device configured to receive the plurality of AR images from the external server through the wireless communication; and
a display device configured to display the surrounding image and the plurality of AR images,
wherein the external server generates a window separately displaying a first area including a particular AR image overlapping at least one of the plurality of AR images, and transmits the window to the communication device, and the display device displays the surrounding image, the plurality of AR images, and the window in an overlapping manner, and
wherein the external server selects AR images overlapping a vanishing line or vanishing point of the surrounding image from among the plurality of AR images, sets the first area including an AR image overlapping at least one of the selected AR images, and adjusts a size of the first area based on a size of the window.

13. The AR navigation system of claim 12, wherein the external server and the communication device transmit information using V2X vehicle-to-everything (V2X) communication.

14. The AR navigation system of claim 12, wherein the external server removes the window based on an overlap of the particular AR image being released.

15. An augmented reality (AR) navigation system comprising:
a camera configured to photograph a surrounding image of a vehicle;
a position data generation device configured to generate current position data of the vehicle;
a processor configured to calculate coordinate information of each of a plurality of objects displayed on the surrounding image based on the current position data and the surrounding image;
an external server configured to receive the coordinate information through wireless communication and generate a plurality of AR images related to the coordinate information;
a communication device configured to receive the plurality of AR images from the external server through the wireless communication; and
a display device configured to display the surrounding image and the plurality of AR images,
wherein the external server generates a window separately displaying a first area including a particular AR image overlapping at least one of the plurality of AR images, and transmits the window to the communication device, and
the display device displays the surrounding image, the plurality of AR images, and the window in an overlapping manner,
wherein the external server converts the first area into a two-dimensional image, and displays the converted two-dimensional image on the window, and
wherein the external server calculates a scale ratio at which a size of the converted two-dimensional image can be included in the window, converts the converted two-dimensional image into a 2.5-dimensional image based on the calculated scale ratio being greater than a preset threshold, and displays the converted 2.5-dimensional image on the window.

* * * * *